(12) United States Patent
Yuzuriha

(10) Patent No.: US 9,445,189 B2
(45) Date of Patent: Sep. 13, 2016

(54) NOISE SUPPRESSING APPARATUS AND NOISE SUPPRESSING METHOD

(71) Applicant: Panasonic Intellectual Property Corporation of America, Torrance, CA (US)

(72) Inventor: Shinichi Yuzuriha, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 21 days.

(21) Appl. No.: 14/565,933

(22) Filed: Dec. 10, 2014

(65) Prior Publication Data

US 2015/0189432 A1 Jul. 2, 2015

(30) Foreign Application Priority Data

Dec. 27, 2013 (JP) .................................. 2013-273337
Sep. 1, 2014 (JP) .................................. 2014-177534

(51) Int. Cl.
*H04B 15/00* (2006.01)
*H04R 3/00* (2006.01)
*H04N 7/10* (2006.01)

(52) U.S. Cl.
CPC ............... *H04R 3/00* (2013.01); *H04N 7/102* (2013.01); *H04R 2410/00* (2013.01); *H04R 2430/03* (2013.01); *H04R 2499/11* (2013.01); *H04R 2499/13* (2013.01)

(58) Field of Classification Search
None
See application file for complete search history.

(56) References Cited

U.S. PATENT DOCUMENTS

| 5,839,101 A * | 11/1998 | Vahatalo | G10L 21/0208 704/217 |
| 2006/0053007 A1* | 3/2006 | Niemisto | G10L 25/78 704/233 |
| 2013/0138434 A1* | 5/2013 | Furuta | G10L 21/0208 704/226 |

FOREIGN PATENT DOCUMENTS

JP 2005-202222 7/2005

OTHER PUBLICATIONS

T.Lotter et al., "Noise reduction by maximum a posteriori spectral amplitude estimation with supergaussian speech modeling", IWAENC 2003, pp. 83-86.

* cited by examiner

*Primary Examiner* — Muhammad N Edun
(74) *Attorney, Agent, or Firm* — Greenblum & Bernstein, P.L.C.

(57) ABSTRACT

A noise suppressing apparatus that calculates a suppression coefficient for suppressing noise of an input signal by using a frequency spectrum of the input signal includes a frequency converting section that converts the input signal into a frequency spectrum; a noise level estimating section that calculates an estimated noise level of the input signal; a weight coefficient calculating section that calculates N (N is 2 or more) weight coefficients at predetermined intervals; and a suppression coefficient calculating section that calculates a joint distribution model of sound by weighting N statistical distribution models with the N weight coefficients, derives an estimation expression for a sound spectrum of the input signal on the basis of posteriori probability using the calculated joint distribution model of sound as priori probability, and calculates the suppression coefficient on the basis of the derived estimation expression and level of the input signal.

11 Claims, 16 Drawing Sheets

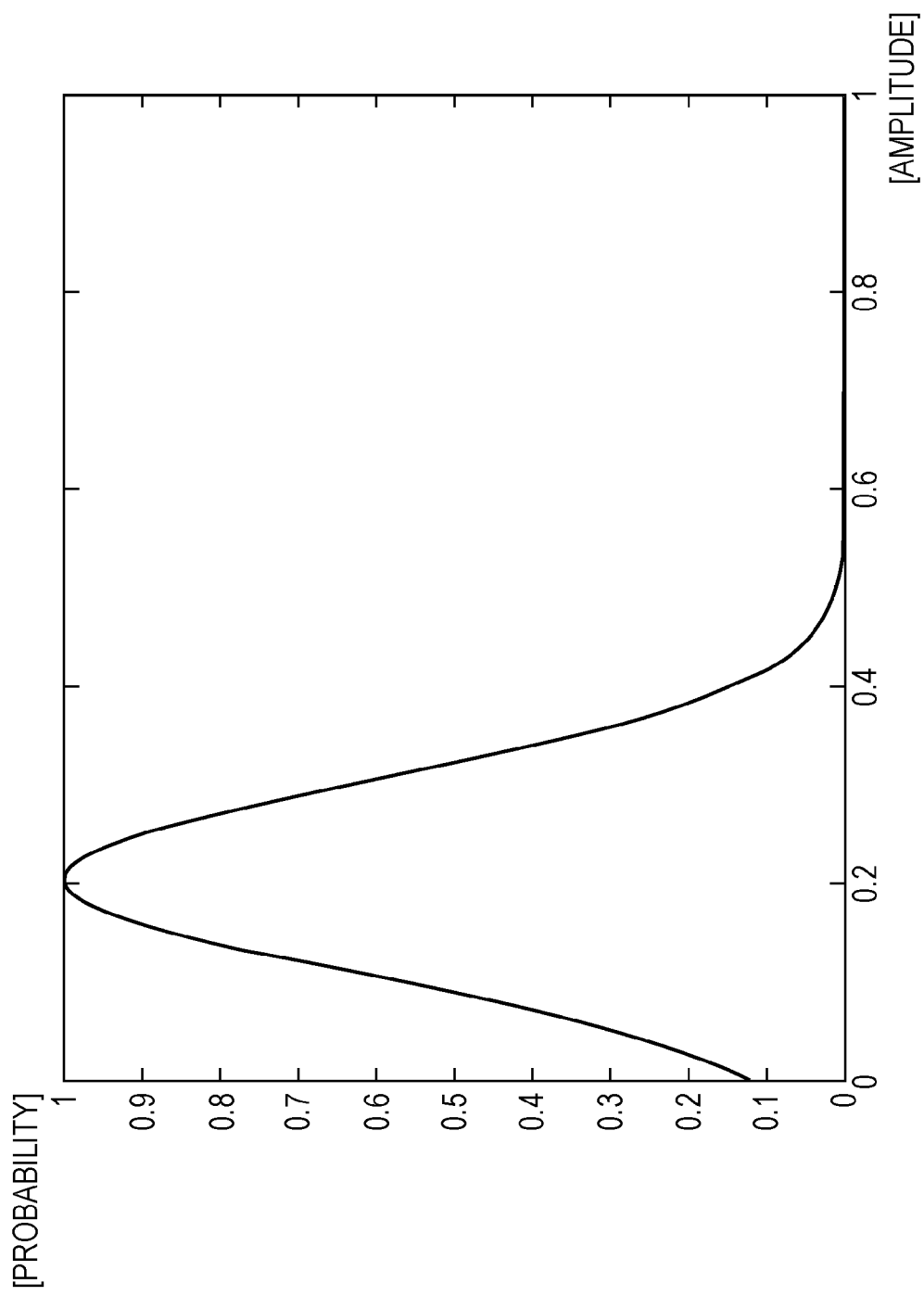

NOISE SUPPRESSING APPARATUS AND NOISE SUPPRESSING METHOD

CROSS REFERENCES TO RELATED APPLICATIONS

This Application claims priority to Japanese Patent Application No. 2013-273337 filed on Dec. 27, 2013, and Japanese Patent Application No. 2014-177534 filed on Sep. 1, 2014, the contents of which are hereby incorporated by reference.

BACKGROUND

1. Technical Field

The present invention relates to a noise suppressing apparatus and a noise suppressing method that calculate a suppression coefficient for suppressing noise of an input signal.

2. Description of the Related Art

A hands-free telephone system is used as a video conference system etc. This telephone system includes a noise suppressing apparatus that suppresses noise contained in a signal collected by a microphone. This telephone system is installed in various environments, but when the telephone system is installed in an environment where background noise is large, the clarity of sound during a telephone call undesirably decreases. Furthermore, in recent years, this telephone system has been installed in cars, in which the background noise has a stronger influence. Therefore, a noise suppressing apparatus that has high noise suppression performance and achieves high-quality sound is desired.

For example, T. Lotter et al., "Noise reduction by maximum a posteriori spectral amplitude estimation with super-gaussian speech modeling", IWAENC 2003, pp. 83-86 (hereinafter referred to as "NPL 1") and Japanese Patent NO. 4542790 (hereinafter referred to as "PTL 1") propose a noise suppressing apparatus and a noise suppressing method that calculate a suppression coefficient for suppressing noise. NPL 1 and PTL 1 propose a noise suppressing apparatus and a noise suppressing method that calculate a suppression coefficient for suppressing noise while keeping the amount of computation low by utilizing MAP estimation and Bayes' theorem.

SUMMARY

However, according to the techniques disclosed in NPL 1 and PTL 1, the accuracy with which a noise suppression coefficient can be calculated is not sufficient. Therefore, although the effect of noise suppression can be obtained, a sound signal is also suppressed. This undesirably causes a deterioration in sound quality and a decrease in clarity.

Thus, a non-limiting exemplary embodiment of the present disclosure provides a noise suppressing apparatus and a noise suppressing method that can calculate a noise suppression coefficient that achieves higher estimation accuracy.

A noise suppressing apparatus according to an aspect of the present disclosure that calculates a suppression coefficient for suppressing noise of an input signal by using a frequency spectrum of the input signal includes: a frequency converting section that converts the input signal into a frequency spectrum; a noise level estimating section that calculates an estimated noise level of the input signal by using the frequency spectrum; a weight coefficient calculating section that calculates N weight coefficients at predetermined intervals, N being 2 or more; and a suppression coefficient calculating section that calculates a joint distribution model of sound by weighting N statistical distribution models by using the N weight coefficients, derives an estimation expression for a sound spectrum of the input signal on the basis of posteriori probability using the calculated joint distribution model of sound as priori probability, and calculates the suppression coefficient on the basis of the derived estimation expression for the sound spectrum of the input signal and level of the input signal.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

According to the present disclosure, it is possible to provide a noise suppressing apparatus etc. that can calculate a noise suppression coefficient that achieves higher estimation accuracy.

Additional benefits and advantages of the disclosed embodiments will be apparent from the specification and Figures. The benefits and/or advantages may be individually provided by the various embodiments and features of the specification and Figures, and need not all be provided in order to obtain one or more of the same.

BRIEF DESCRIPTION OF THE DRAWINGS

FIG. 5 is a view showing an example of a statistical distribution model of noise that is observation data according to the embodiment.

DETAILED DESCRIPTION

Underlying Knowledge Forming Basis of the Present Disclosure

Underlying knowledge forming basis of the present disclosure is described below.

Figure 1:
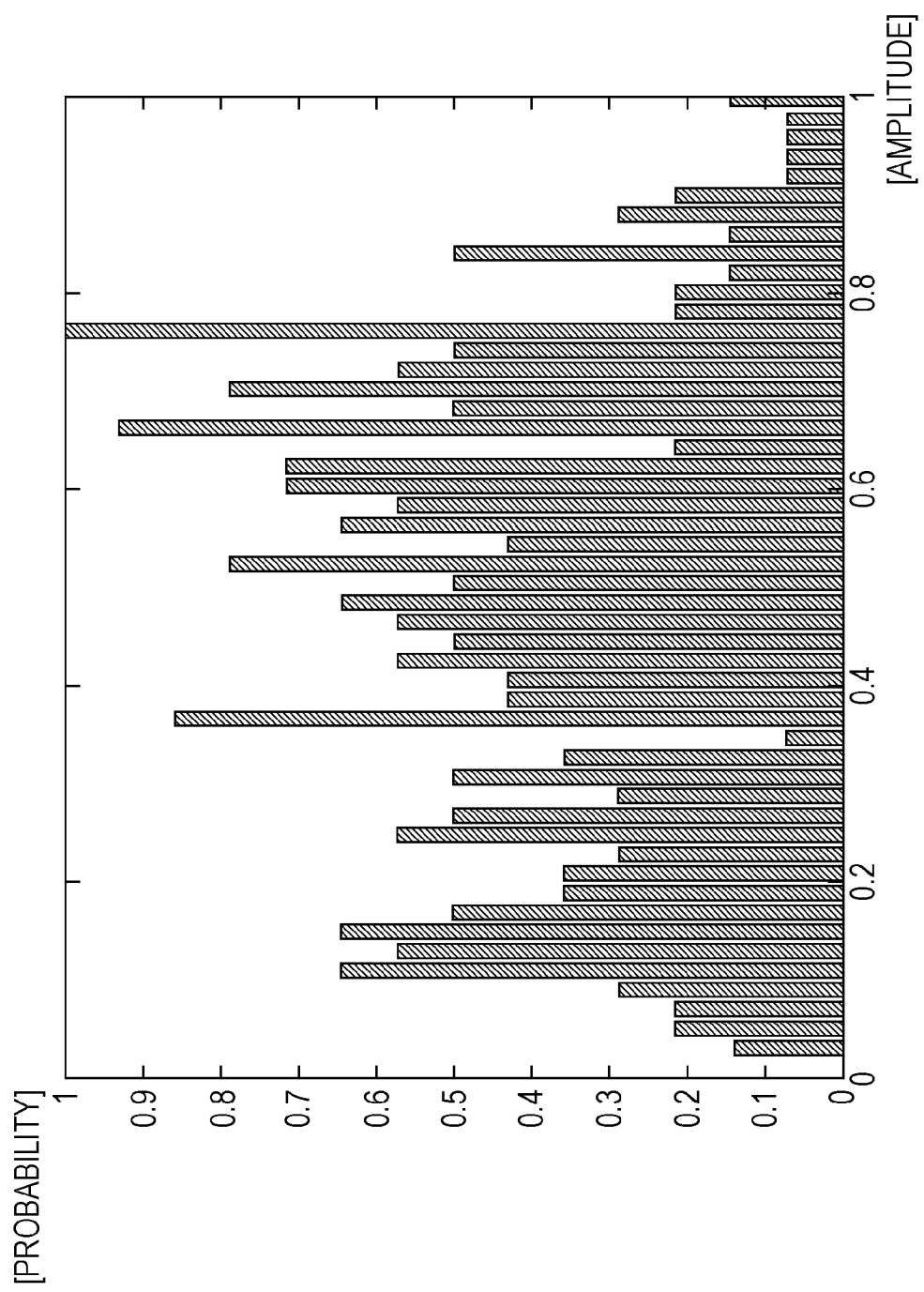
FIG. 1 is a view showing an example of a histogram of a distribution of an amplitude spectrum of sound obtained in a case where only sound exists in an analysis segment.
Figure 2:
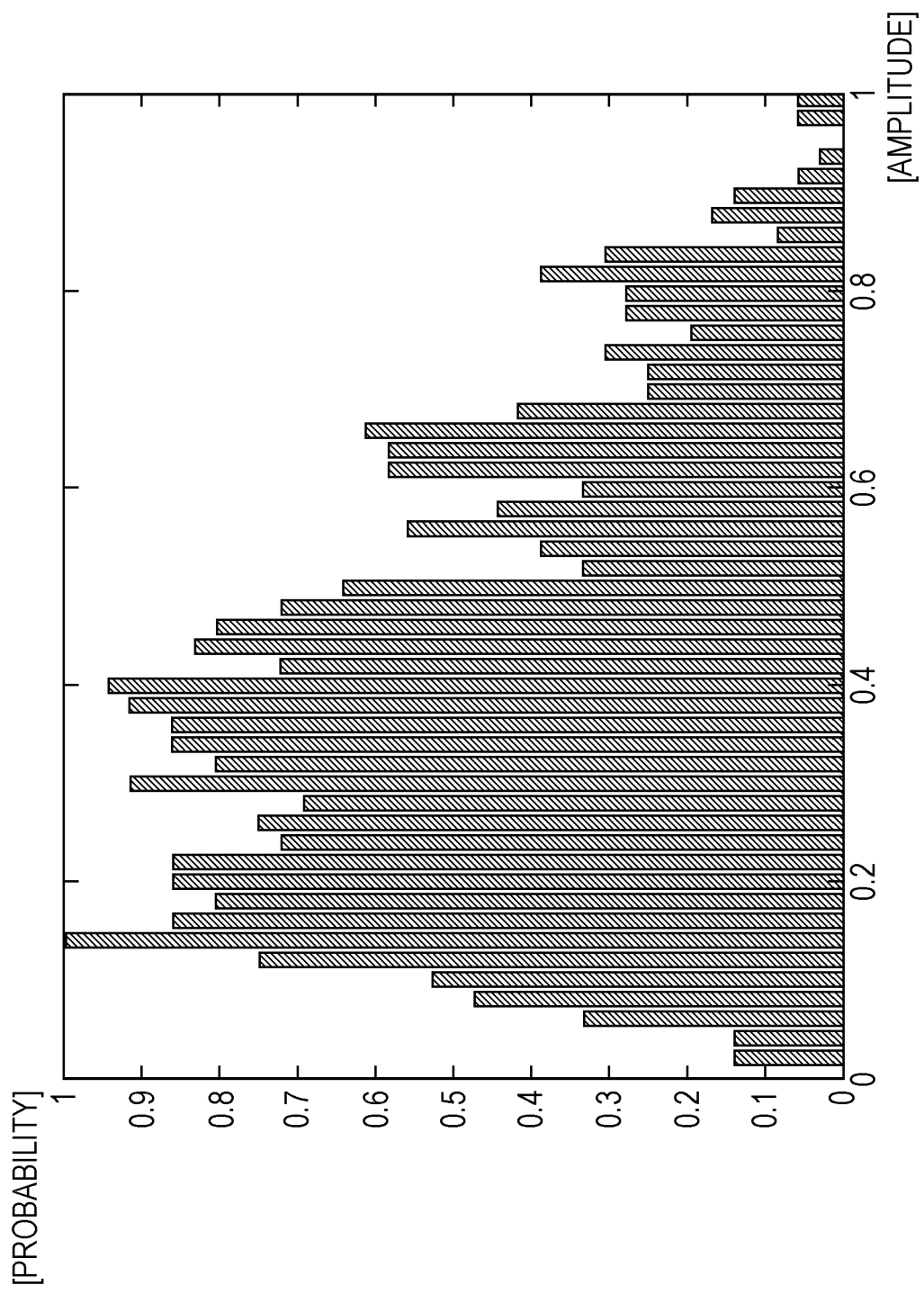
FIG. 2 is a view showing an example of a histogram of a distribution of an amplitude spectrum of sound obtained in a case where only sound exists in an analysis segment and a signal level is low.
Figure 3:
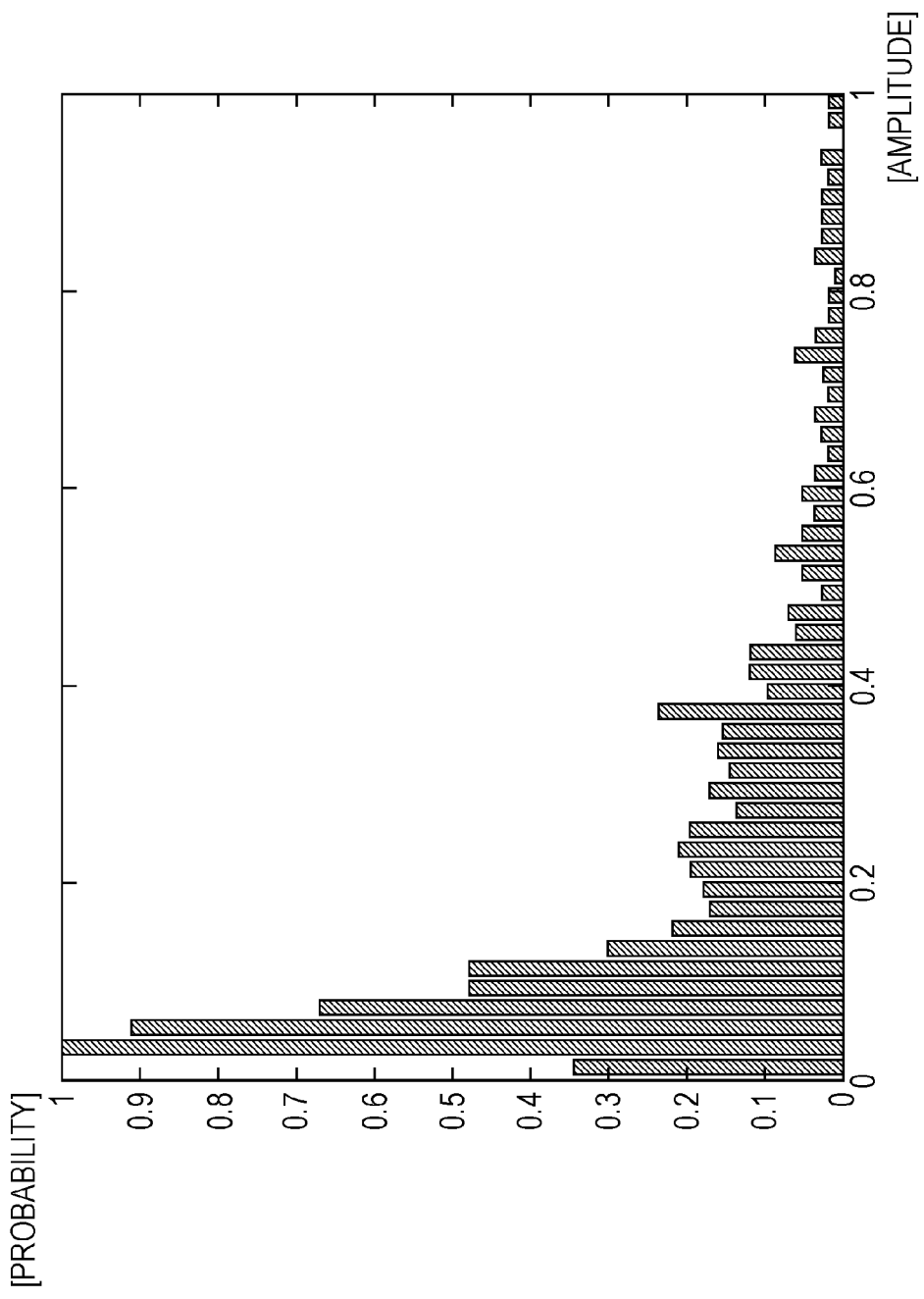
FIG. 3 is a view showing an example of a histogram of a distribution of an amplitude spectrum of sound obtained in a case where a noise segment and a sound segment concurrently exist in an analysis segment.

FIG. 1 is a view showing an example of a histogram of a distribution of an amplitude spectrum of sound obtained in a case where only sound exists in an analysis segment. FIG. 2 is a view showing an example of a histogram of a distribution of an amplitude spectrum of sound obtained in a case where only sound exists in an analysis segment and a signal level is low. FIG. 3 is a view showing an example of a histogram of a distribution of an amplitude spectrum of sound obtained in a case where a noise segment and a sound segment concurrently exist in an analysis segment.

NPL 1 and PTL 1 propose a method for calculating a suppression coefficient for suppressing noise while keeping the amount of computation low by utilizing MAP estimation and Bayes' theorem.

Specifically, NPL 1 proposes a method for approximating an amplitude of a frequency spectrum of sound signal with a probability density function of a gamma distribution or a Laplace distribution, approximating a frequency spectrum of a noise signal with a normal distribution, and deriving an estimation expression for a noise suppression coefficient by utilizing MAP estimation and Bayes' theorem. According to this method, the estimation expression for the noise suppression coefficient is simple. It is therefore possible to reduce the amount of computation.

However, an amplitude distribution of a frequency spectrum of sound in an analysis segment takes various shapes depending on the level of the sound signal, the presence or absence of a noise segment (a segment in which no sound signal exists), and the frequency (see, for example, FIGS. 1 to 3). In particular, in a segment in which only a sound signal exists as shown in FIG. 1, the amplitude distribution of the frequency spectrum of sound in the analysis segment does not become a gamma distribution nor a Laplace distribution. That is, a sound signal including a silent segment (an amplitude distribution of a frequency spectrum of sound) shown in FIG. 3 can be approximated by a gamma distribution or a Laplace distribution, but a sound signal in a segment in which only a sound signal exists as shown in FIG. 1 cannot be approximated by a gamma distribution nor a Laplace distribution. Therefore, the accuracy of a noise suppression coefficient calculated in the segment shown in FIG. 1 is low. Accordingly, although the effect of noise suppression can be obtained, a sound signal is also suppressed. This undesirably causes a deterioration in sound quality and a decrease in clarity.

PTL 1 proposes a method for approximating a real part and an imaginary part of a frequency spectrum of sound signal with a Laplace distribution, approximating a real part and an imaginary part of a frequency spectrum of a noise signal with a normal distribution, and deriving an estimation expression for a noise suppression coefficient by utilizing MAP estimation and Bayes' theorem.

However, since a sound signal is approximated with a Laplace distribution, a sound signal in a segment in which only a sound signal including no silent segment exists cannot be approximated with a gamma distribution nor a Laplace distribution, as in NPL 1. Meanwhile, in PTL 1, since an analysis segment is relatively long (sec or msec order), an average distribution shape in a relatively long analysis segment can be approximated even with a gamma distribution or a Laplace distribution. Therefore, the effect of noise suppression can be obtained. However, since a sound signal including no silent segment is also rounded, accuracy of a calculated noise suppression coefficient is low. Therefore, in PTL 1, a sound signal is also suppressed. This undesirably causes a deterioration in sound quality and a decrease in clarity.

A distribution of a sound spectrum marketly varies depending on the level of a sound signal in an analysis segment, presence or absence of a noise segment (a segment in which no sound signal exists), etc. For example, as shown in FIG. 1, when focusing on a segment in which only a sound spectrum including no noise segment exists, a distribution that can be approximated with a gamma distribution or a Laplace distribution is not obtained. The same is true for a case where a sound level is low as shown in FIG. 2. It is in the case where a noise segment and a sound segment concurrently exist as shown in FIG. 3 that a distribution has a shape close to an exponential distribution such as a gamma distribution or a Laplace distribution.

As described above, according to the techniques disclosed in NPL 1 and PTL 1, since a probability density function of a sound signal is expressed by a single statistical distribution model, accuracy of approximation of a sound spectrum in a sound segment in which distributions of various shapes exist becomes low. Therefore, according to conventional techniques, the accuracy of estimation of a noise suppression coefficient for suppressing only noise is low. This causes a deterioration in sound quality and a decrease in clarity. Based on the above discussion, the inventors of the present invention attained the aspects of the present disclosure.

A noise suppressing apparatus according to the present disclosure that calculates a suppression coefficient for suppressing noise of an input signal by using a frequency spectrum of the input signal includes: a frequency converting section that converts the input signal into a frequency spectrum; a noise level estimating section that calculates an estimated noise level of the input signal by using the frequency spectrum; a weight coefficient calculating section that calculates N weight coefficients at predetermined intervals, N being 2 or more; and a suppression coefficient calculating section that calculates a joint distribution model of sound by weighting N statistical distribution models by using the N weight coefficients, derives an estimation expression for a sound spectrum of the input signal on the basis of posteriori probability using the calculated joint distribution model of sound as priori probability, and calculates the suppression coefficient on the basis of the derived estimation expression for the sound spectrum of the input signal and level of the input signal.

According to the arrangement, it is possible to provide a noise suppressing apparatus that can calculate a noise suppression coefficient that achieves higher estimation accuracy.

Specifically, since it is possible to accurately approximate the probability of occurrence of sound (sound spectrum) included in an input signal, a noise suppression coefficient that can achieve higher estimation accuracy can be calculated. It is therefore possible to provide a noise suppressing apparatus that can remove noise without over-suppression of sound while maintaining high noise suppression performance.

The noise suppressing apparatus may be arranged such that the suppression coefficient calculating section derives the estimation expression for the sound spectrum of the input signal by using the product of the joint distribution model of sound and a statistical distribution model of noise that approximates the probability of observed noise.

The noise suppressing apparatus may be for example arranged such that the joint distribution model of sound approximates probability of occurrence of the sound spectrum of the input signal; and the suppression coefficient calculating section calculates, as the joint distribution model of sound, the product of the N statistical distribution models weighted by using the N weight coefficients.

According to the arrangement, the joint distribution model of sound is expressed by the product of N (2 or more) statistical distribution models. Since the joint distribution model of sound that is obtained by multiplying random variables that correspond to the N statistical distribution models by the N weight coefficients calculated by the weight coefficient calculating section can express various distribution shapes, it is possible to increase the accuracy of approximation of a sound spectrum included in an input signal. This makes it possible to calculate a noise suppression coefficient that achieves higher estimation accuracy.

The noise suppressing apparatus may be for example arranged to further include: a priori SNR calculating section that calculates a priori SNR indicative of a ratio of a weighted signal level to a noise level by using the frequency spectrum, the estimated noise level, and a suppression coefficient calculated previously; a posteriori SNR calculating section that calculates a posteriori SNR indicative of a ratio of the input signal level to the noise level by using the frequency spectrum and the estimated noise level; and a time signal converting section that converts, into a time signal, a weighted frequency spectrum obtained by multiplying the frequency spectrum by a current suppression coefficient calculated by the suppression coefficient calculating section, the weight coefficient calculating section calculating the N weight coefficients by using the priori SNR or the posteriori SNR, and the suppression coefficient calculating section (i) calculating, as the joint distribution model of sound that approximates the probability of occurrence of the sound spectrum included in the frequency spectrum, a product of the N statistical distribution models weighted by using the N weight coefficients calculated by the weight coefficient calculating section, (ii) calculates a statistical distribution model of noise that approximates the probability of occurrence of a noise spectrum included in the frequency spectrum, (iii) derives the estimation expression for the sound spectrum of the input signal from the product of the calculated statistical distribution model of noise and the joint distribution model of sound, and (iv) calculates the suppression coefficient from the estimation expression for the sound spectrum by using the priori SNR, the posteriori SNR, and the N weight coefficients calculated by the weight coefficient calculating section.

According to the arrangement, it is possible to accurately approximate the probability of occurrence of a sound spectrum included in an input signal. It is therefore possible to calculate a noise suppression coefficient that achieves a higher estimation accuracy.

For example, in a case where weight coefficients of random variables that correspond to N statistical distribution models are associated with the value of a posteriori SNR, the posteriori SNR is characterized by having a value close to 1 in a noise segment and having a value larger than 1 in a segment in which sound exists since the posteriori SNR is a ratio of an input signal level to an estimated noise signal level. By utilizing this characteristic, it is possible to determine the weight coefficients.

For example, in a case where weight coefficients of random variables that correspond to N statistical distribution models are associated with the value of a priori SNR, the priori SNR is characterized by having a value close to 0 in a noise segment and having a value larger than 0 in a segment in which sound exists since the priori SNR is a ratio of a signal obtained by removing noise from an input signal level by using a past noise suppression coefficient to an estimated noise signal level. By utilizing this characteristic, it is possible to determine the weight coefficients.

The noise suppressing apparatus may be arranged such that the N statistical distribution models include a gamma distribution model and a Rayleigh distribution model.

The noise suppressing apparatus may be arranged such that a combination of statistical distribution models that constitute the N statistical distribution models differs in 2 or more bands of the frequency spectrum.

According to the arrangement, it is possible to cause a combination of the N statistical distribution models to be different in two or more frequency components of the frequency spectrum. This makes it possible to select an optimum configuration, for example, in different bands of a frequency constituted by a low band and a high band.

The noise suppressing apparatus may be, for example, arranged such that the weight coefficient calculating section calculates the N weight coefficients including 2 or more different weight coefficients in 2 or more bands of the frequency spectrum.

The noise suppressing apparatus may be, for example, arranged such that the N statistical distribution models approximate the probability of occurrence of an amplitude spectrum of sound.

Since each of the N statistical distribution models is constituted by a distribution of an amplitude spectrum of sound, it becomes possible to use a distribution, such as a gamma distribution, that can use only a positive value. It is therefore possible to improve the flexibility with which a distribution shape can be expressed by a joint distribution model of sound.

The noise suppressing apparatus may be for example arranged such that the suppression coefficient calculating section derives, as a function expression, the estimation expression for the sound spectrum of the input signal by using MAP (maximum a posteriori) estimation and Bayes' theorem.

The noise suppressing apparatus may be for example arranged such that the suppression coefficient calculating section calculates the suppression coefficient in accordance with an arithmetic expression obtained by partially differentiating the derived estimation expression for the sound spectrum with an amplitude of the sound spectrum and setting the partially differentiated estimation expression to zero.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

A noise suppressing apparatus or the like according to an aspect of the present disclosure is specifically described below with reference to the drawings.

Each of the embodiments below illustrates a specific example of the present disclosure. Numerical values, shapes, materials, constituent elements, positions and the way in which the constituent elements are combined, steps, the order of the steps, etc. shown in the embodiments below are examples and are not intended to limit the present disclosure. Furthermore, out of the constituent elements shown in the embodiments below, constituent elements that are not described in independent claims that show the highest concepts are described as optional constituent elements.

Embodiments

Configuration of Noise Suppressing Apparatus

Figure 4A:
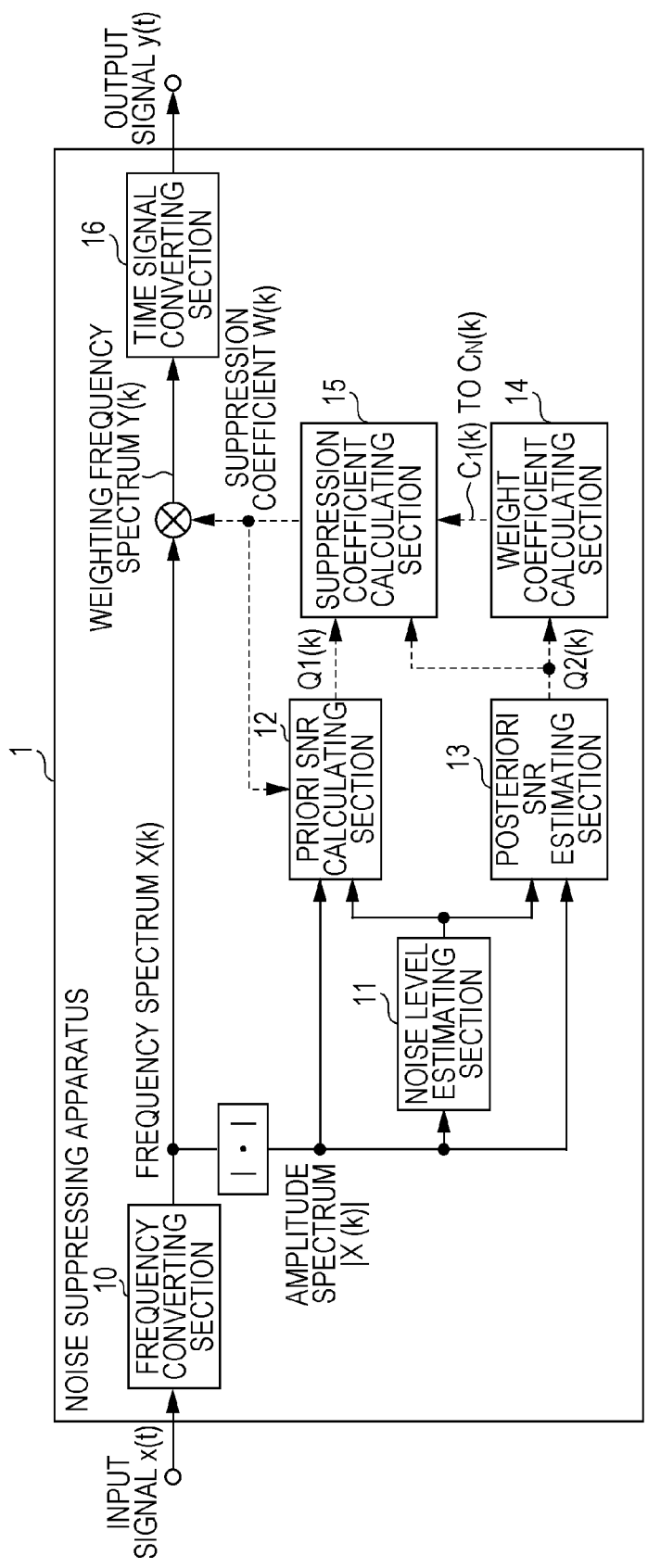
FIG. 4A is a view showing an example of a configuration of a noise suppressing apparatus according to an embodiment.
Figure 4B:
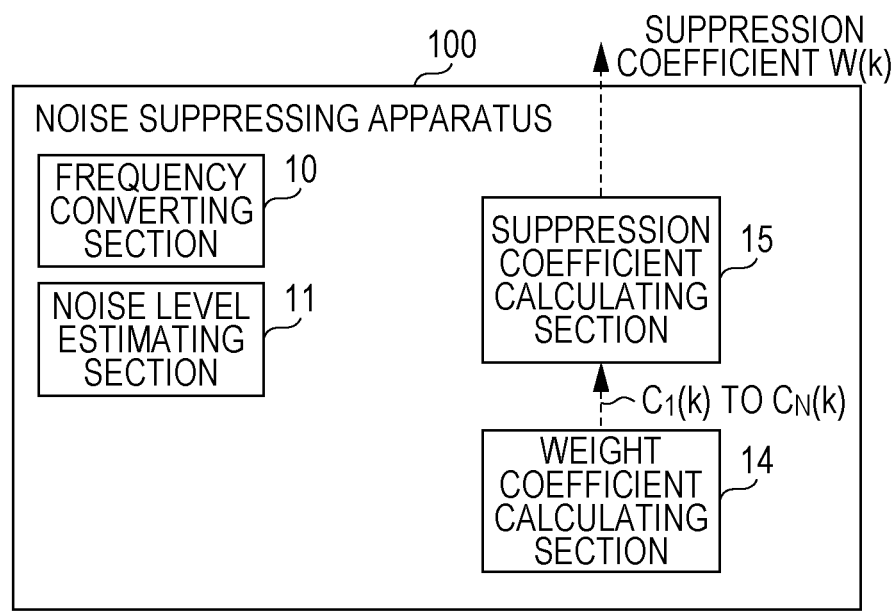
FIG. 4B is a view showing an example of a minimum configuration of the noise suppressing apparatus according to an embodiment.

FIG. 4A is a view showing an example of a configuration of a noise suppressing apparatus according to an embodiment. FIG. 4B is a view showing an example of a minimum configuration of the noise suppressing apparatus according to the embodiment.

The noise suppressing apparatus 1 shown in FIG. 4A includes a frequency converting section 10, a noise level estimating section 11, a priori SNR calculating section 12, a posteriori SNR estimating section 13, a weight coefficient calculating section 14, a suppression coefficient calculating section 15, and a time signal converting section 16. The noise suppressing apparatus 1 calculates a suppression coefficient for suppressing noise of an input signal by using a frequency spectrum of the input signal. Note that the noise suppressing apparatus 100 shown in FIG. 4B is a minimum configuration of the noise suppressing apparatus 1 shown in FIG. 4A and includes the noise level estimating section 11, the weight coefficient calculating section 14, and the suppression coefficient calculating section 15.

The configuration of the noise suppressing apparatus 1 is described below in detail.

The frequency converting section 10 converts an input signal into a frequency spectrum. In the present embodiment, the frequency converting section 10 receives an input signal $x(t)$ (t is a sample of a time signal), converts the input signal $x(t)$ into a frequency spectrum $X(k)$ (k is a sample of a frequency) by using a frequency analysis method such as Fourier transform or wavelet transform, and outputs the frequency spectrum $X(k)$.

The noise level estimating section 11 calculates an estimated noise level of the input signal by using the frequency spectrum obtained through the conversion in the frequency converting section 10. In the present embodiment, the noise level estimating section 11 receives the frequency spectrum $X(k)$ and estimates a noise level $N(k)^2$ by performing time movement averaging or the like in a noise segment by using, for example, an absolute value $|X(k)|$ of the frequency spectrum or a power spectrum $X(k)^2$ ($^2$ represents "squared") of the input signal $x(t)$. Note that the noise level estimating section 11 may estimate, instead of the noise level $N(k)^2$, an average noise level that is the weighted mean of the noise level $N(k)^2$ and a past noise level.

The priori SNR calculating section 12 calculates a priori SNR, which is the ratio of a weighted signal level to a noise level, by using the frequency spectrum, the estimated noise level, and a suppression coefficient calculated previously. In the present embodiment, the priori SNR calculating section 12 calculates $Q1(k)$, which is the ratio (a priori SNR) of (i) a signal level (weighted signal level) in which noise has been removed by multiplying the power spectrum $X(k)^2$ of the input signal $x(t)$ calculated from the frequency spectrum $X(k)$ by the square of a noise suppression coefficient $W(k)$ calculated previously to (ii) the noise level $N(k)^2$ outputted from the noise level estimating section 11.

The priori SNR is the ratio of a signal obtained by removing noise from an input signal level by using a past noise suppression coefficient to an estimated noise signal level, and is therefore characterized by having a value that is close to zero in a noise segment and having a value larger than zero in a segment in which sound exists. Therefore, by utilizing this characteristic, weighting coefficients $c1(k), \ldots,$ and $cN(k)$ that will be described later can be determined.

The priori SNR calculating section 12 may calculate a signal level obtained by noise removal (a weighted signal level) by subtracting the noise level $N(k)^2$ from the power spectrum $X(k)^2$ of the input signal by using a spectrum subtraction method. Alternatively, the priori SNR calculating section 12 may calculate a signal level obtained by noise removal (a weighted signal level) by obtaining the weighted mean of a signal level that is calculated by using the noise suppression coefficient $W(k)$ calculated previously and a signal level that is calculated by using a spectrum subtraction method.

The posteriori SNR estimating section 13 calculates a posteriori SNR, which is the ratio of an input signal level to a noise level, by using the frequency spectrum and the estimated noise level. In the present embodiment, the posteriori SNR estimating section 13 calculates $Q2(k)$, which is the ratio (a posteriori SNR) of the power spectrum $X(k)^2$ of the input signal $x(t)$ calculated from the frequency spectrum $X(k)$ to the noise level $N(k)^2$ outputted from the noise level estimating section 11.

The posteriori SNR is the ratio of an input signal level to an estimated noise signal level, and is therefore characterized by having a value that is close to 1 in a noise segment and having a value larger than 1 in a segment in which sound exists. By utilizing this characteristic, weight coefficients $c1(k), \ldots,$ and $cN(k)$ that will be described later can be determined.

The weight coefficient calculating section 14 calculates N (N is 2 or more) weight coefficients at predetermined intervals. Furthermore, the weight coefficient calculating section 14 calculates the N weight coefficients by using the priori SNR or the posteriori SNR. In the present embodiment, the weight coefficient calculating section 14 calculates the weight coefficients $c1(k), \ldots,$ and $cN(k)$ by which random variables that correspond to N (2 or more) statistical distribution models are to be multiplied. Each of the N statistical distribution models is, for example, a model that approximates a distribution of probability of occurrence of an amplitude spectrum of sound. Note that each of the N statistical distribution models may be a model that approximates a distribution of probability of occurrence of a power spectrum of sound, provided that the probability of occurrence is probability of occurrence of a spectrum with no phase information. Furthermore, each of the N statistical distribution models may include a normal distribution model and a Rayleigh distribution model.

The time signal converting section 16 converts, into a time signal, a weighted frequency spectrum obtained by multiplying a frequency spectrum by a current suppression coefficient calculated in the suppression coefficient calculating section 15. In the present embodiment, the time signal converting section 16 converts, into an output signal $y(t)$, which is a time signal, a spectrum $Y(k)$ (a weighted frequency spectrum) obtained by multiplying the frequency spectrum $X(k)$ by the suppression coefficient $W(k)$ calculated in the suppression coefficient calculating section 15, and then outputs the output signal y (t).

The suppression coefficient calculating section 15 calculates a joint distribution model of sound by weighting the N statistical distribution models by using the N weight coefficients, derives an estimation expression for the sound spectrum of the input signal on the basis of posteriori probability that uses the calculated joint distribution model of sound as priori probability, and calculates the suppression coefficient on the basis of the derived estimation expression for the sound spectrum of the input signal and the level of the input signal. The joint distribution model of sound approximates probability of occurrence of the sound spectrum of the input signal, and the suppression coefficient calculating section 15 calculates a posteriori probability distribution by using the product of the joint distribution model of sound and a statistical distribution model of noise that approximates probability of observed noise by utilizing Bayes' theorem, and derives the estimation expression of the sound spectrum of the input signal.

More specifically, the suppression coefficient calculating section 15 calculates, as the joint distribution model of sound that approximates probability of occurrence of the sound spectrum included in the frequency spectrum, the product of the N statistical distribution models weighted by using the N weight coefficients calculated by the weight coefficient calculating section 14, and calculates a statistical distribution model of noise that approximates probability of occurrence of a noise spectrum included in the frequency spectrum. The suppression coefficient calculating section 15 calculates a posteriori probability distribution on the basis of the product of the calculated statistical distribution model of noise and the calculated joint distribution model of sound by utilizing Bayes' theorem, derives an estimation expression for the sound spectrum of the input signal, and calculates the suppression coefficient on the basis of the estimation expression for the sound spectrum by using the priori SNR, the posteriori SNR, and the N weight coefficients calculated by the weight coefficient calculating section 14.

In the present embodiment, the suppression coefficient calculating section 15 derives the estimation expression for the sound spectrum of the input signal by utilizing MAP estimation and Bayes' theorem. Specifically, the suppression coefficient calculating section 15 derives the estimation expression for the sound spectrum from the product of a joint distribution model of sound, which is expressed by the product of at least N (N≥2) statistical distribution models that approximate probability of occurrence of a sound spectrum, and a noise distribution model that approximates probability of occurrence of a noise spectrum.

The joint distribution model of sound is expressed by the product of N (2 or more) statistical distribution models. The joint distribution model of sound is obtained by multiplying the random variables that correspond to the N statistical distribution models by the N weight coefficients calculated by the weight coefficient calculating section 14. Therefore, various distribution shapes can be expressed by changing the N weight coefficients. That is, it is possible to increase accuracy of approximation of the sound spectrum included in the input signal.

The suppression coefficient calculating section 15 derives a suppression coefficient in accordance with an arithmetic expression for a noise suppression coefficient that is obtained by partially differentiating the derived estimation expression for the sound spectrum with the amplitude of the sound spectrum and setting the partially differentiated estimation expression to zero. Specifically, the suppression coefficient calculating section 15 calculates the suppression coefficient by assigning the priori SNR (Q1 (k)), the posteriori SNR (Q2 (k)), and the weight coefficients (c1 (k), . . . and cN (k)) to the obtained arithmetic expression for the noise suppression coefficient. Note that the joint distribution model of sound can be adaptively changed (changed at predetermined intervals, which encompasses sequential change) by changing the weight coefficients (c1 (k), . . . and cN (k)) in the arithmetic expression for the noise suppression coefficient at predetermined intervals. That is, the weight coefficients that adaptively change can be directly reflected in the suppression coefficient in the arithmetic expression for the noise suppression coefficient. This makes it possible to calculate a more accurate suppression coefficient.

Derivation of Arithmetic Expression for Suppression Coefficient

Derivation of an arithmetic expression for a noise suppression coefficient used to calculate a suppression coefficient is described below.

Estimation Expression of Sound Spectrum

When MAP estimation and Bayes' theorem are used, an estimated amplitude value Ŝ of sound (hereinafter, k that represents a frequency component is omitted, unless otherwise specified) can be expressed by the following expression 1, which is a function expression (estimation expression for a sound spectrum) obtained by using the concept of posteriori probability:

$$\hat{S} = \underset{S}{\mathrm{argmax}}\, P(S \mid X) = \underset{S}{\mathrm{argmax}}\, \frac{P(X \mid S)P(S)}{P(X)} \qquad \text{expression 1}$$

In the expression 1, X represents the amplitude of an input signal spectrum, and S represents the amplitude of a sound spectrum.

P (S) represents a joint distribution model of sound indicative of probability of occurrence of the amplitude S of the sound spectrum and corresponds to priori probability used to calculate the posteriori probability.

P (X|S) represents a statistical distribution model of noise and corresponds to observation data used to calculate the posteriori probability.

For example, FIG. 5 is a view showing an example of the statistical distribution model of noise, which is observation data, according to the present embodiment. In the present embodiment, the statistical distribution model of noise, which is observation data, is a statistical distribution model (e.g. normal distribution) indicative of likelihood of a noise signal and is the same as those used in PTL 1 and NPL 1, and therefore is not described in detail.

Joint Distribution Model of Sound

To simplify explanation, it is assumed here that the joint distribution model of sound used to derive the estimation expression for the sound spectrum is generated from two statistical distribution models (a first statistical distribution model and a second statistical distribution model). Note that since the same can be said for a case where the joint distribution model of sound is generated from three or more statistical distribution models, description of this case is omitted.

The first statistical distribution model, which is one of the two statistical distribution models, is referred to as P1 (S), and the second statistical distribution model, which is the other one of the two statistical distribution models, is referred to as P2 (S).

When the weight coefficients calculated by the weight coefficient calculating section 14 are expressed by c1 and c2, the joint distribution model P (S) of sound can be expressed by the following expression 2:

$$P(S)=P1(c1S) \cdot P2(c2S) \qquad \text{expression 2}$$

The concept of joint distribution of sound in the present embodiment is described below.

When an input signal is analyzed, the shape of a distribution of probability of occurrence of a sound spectrum remarkably varies depending on the level of a sound signal included in an analysis segment of the input signal and presence or absence of a noise segment. Therefore, accuracy of approximation is low in a case where an average distribution shape (a distribution fixed as an average one) like the ones disclosed in PTL 1 or NPL 1 is used. For example, a gamma distribution and a Laplace distribution used in PTL 1 or NPL 1 are distributions that have a peak in the vicinity of zero, and it can be assumed that there is no amplitude of sound in a noise segment. Therefore, it can be said that the gamma distribution and the Laplace distribution used in PTL 1 or NPL 1 are suitable for expressing probability of occurrence of sound. However, in a segment in which sound exists, the probability of occurrence takes a distribution like the ones shown in FIGS. 1 and 2, and therefore accuracy of approximation of the probability of occurrence of a sound spectrum is low. That is, over-suppression of a sound signal occurs due to the influence (approximation accuracy) of a shape of a statistical distribution model used to approximate a sound spectrum.

In other words, in a case where a distribution of probability of occurrence of a sound spectrum is approximated by a single statistical distribution as disclosed in PTL 1 or NPL 1, accuracy of approximation of a distribution of probability of occurrence of a sound spectrum of an input signal that fluctuates in accordance with an analysis segment becomes low. In an estimation expression for a sound spectrum derived by using a distribution with low accuracy of approximation, the sound spectrum is also suppressed as the effect of noise suppression is increased. Consequently, sound quality and clarity of sound decrease.

Meanwhile, accuracy of approximation can be improved by using a joint distribution model of sound for approximation of probability of occurrence of a sound spectrum. This is specifically described below. Also in the following description, it is assumed that a joint distribution of sound is generated from two statistical distribution models (a first statistical distribution model and a second statistical distribution model) and each of the two statistical distribution models is a model that approximates a distribution of probability of occurrence of an amplitude spectrum of sound.

It is assumed that the first statistical distribution model P1 (S) is, for example, a gamma distribution, and the second statistical distribution model P2 (S) is, for example, a Rayleigh distribution.

Note that the gamma distribution has high accuracy of approximation to probability of occurrence of sound in a noise segment. Meanwhile, the Rayleigh distribution has high accuracy of approximation to probability of occurrence of sound in a sound segment in which only sound exists. In a case where the sound segment includes a silent segment, the frequency in the vicinity of zero (the amplitude of sound is zero) increases, and therefore the Rayleigh distribution gradually approaches the gamma distribution. For these reasons, in the present embodiment, two statistical distribution models that can efficiently express a noise segment and a sound segment are selected.

Assuming that, out of the weight coefficients outputted from the weight coefficient calculating section 14, a weight coefficient for the first statistical distribution model is c1 and a weight coefficient for the second statistical distribution model is c2 and assuming that a posteriori SNR is $Q_2$, c1 and c2 can be expressed by the following expression 3. Note that the expression 3 is one example, and the weight coefficient calculating section 14 using the posteriori SNR is not limited to this method.

$$c_1 = \text{MAX}(\beta - c_2, \alpha)$$
$$c_2 = \text{MAX}(Q_2 - 1, \alpha) \qquad \text{expression 3}$$

In the expression 3, MAX ( ) means selecting a larger one of two values. $\alpha$ ($\alpha > 0$) and $\beta$ ($\beta > 0$) are constants.

The posteriori SNR is expressed, for example, by a ratio of an input signal level to an estimated noise level and takes a value around 1 in a noise segment. Therefore, in the expression 2, as the input signal level approaches the estimated noise signal level, the value of c1 increases and the value of c2 decreases. That is, the characteristic of the gamma distribution is dominant in the noise segment.

Meanwhile, as the input signal level becomes larger than the estimated noise signal level, the value of c2 increases and the value of c1 decreases contrary to the above case. That is, the characteristic of the Rayleigh distribution is dominant.

Therefore, a dominance ratio of the gamma distribution to the Rayleigh distribution can be adaptively changed in accordance with the level of the input signal in the sound segment.

In other words, in a noise segment (a segment in which sound does not exist), accuracy of approximation of a distribution of a sound spectrum can be increased by making probability of occurrence of an input signal closer to zero. Therefore, a distribution, such as a gamma distribution, an exponential distribution, or a Laplace distribution, that has a high peak in the vicinity of zero is used as one of the N statistical distribution models. Meanwhile, in a segment in which sound is included, a distribution, such as a Rayleigh distribution or a normal distribution, that does not have a high peak in the vicinity of zero is used as one of the N statistical distribution models in order to prevent over-suppression of a sound signal.

For example, in a noise segment (a segment in which sound does not exist), the value of a weight coefficient for the statistical distribution, such as a gamma distribution, that has a high peak in the vicinity of zero is increased so that the influence of such a statistical distribution is increased, and conversely, the value of a weight coefficient that has a low peak in the vicinity of zero is reduced so that the influence of such a statistical distribution is be reduced. By approximating a joint distribution of sound with the product of the N statistical distributions thus calculated, the probability of occurrence of the sound spectrum of the input signal can be made close to zero, thereby making it possible to obtain high accuracy of approximation.

For example, in a segment in which sound is included, contrary to the noise segment, the value of a weight coefficient for a statistical distribution, such as a gamma distribution, that has a high peak in the vicinity of zero is reduced so that the influence of such a statistical distribution is reduced, and the value of a weight coefficient for a statistical distribution that has a low peak in the vicinity of zero is increased so that the influence of such a statistical distribution is increased. By approximating a joint distribution of sound with the product of the N statistical distributions thus calculated, accuracy of approximation of probability of occurrence of the sound spectrum of the input signal in the segment in which sound is included is increased. It is therefore possible to remove noise without over-suppression of sound.

The above description has dealt with a method using a posteriori SNR to calculate weight coefficients, but it is also possible to use a priori SNR. Alternatively, it is also possible to use a result of detection of a noise segment or use a result of detection of a sound segment.

Embodiment 1

Figure 6:
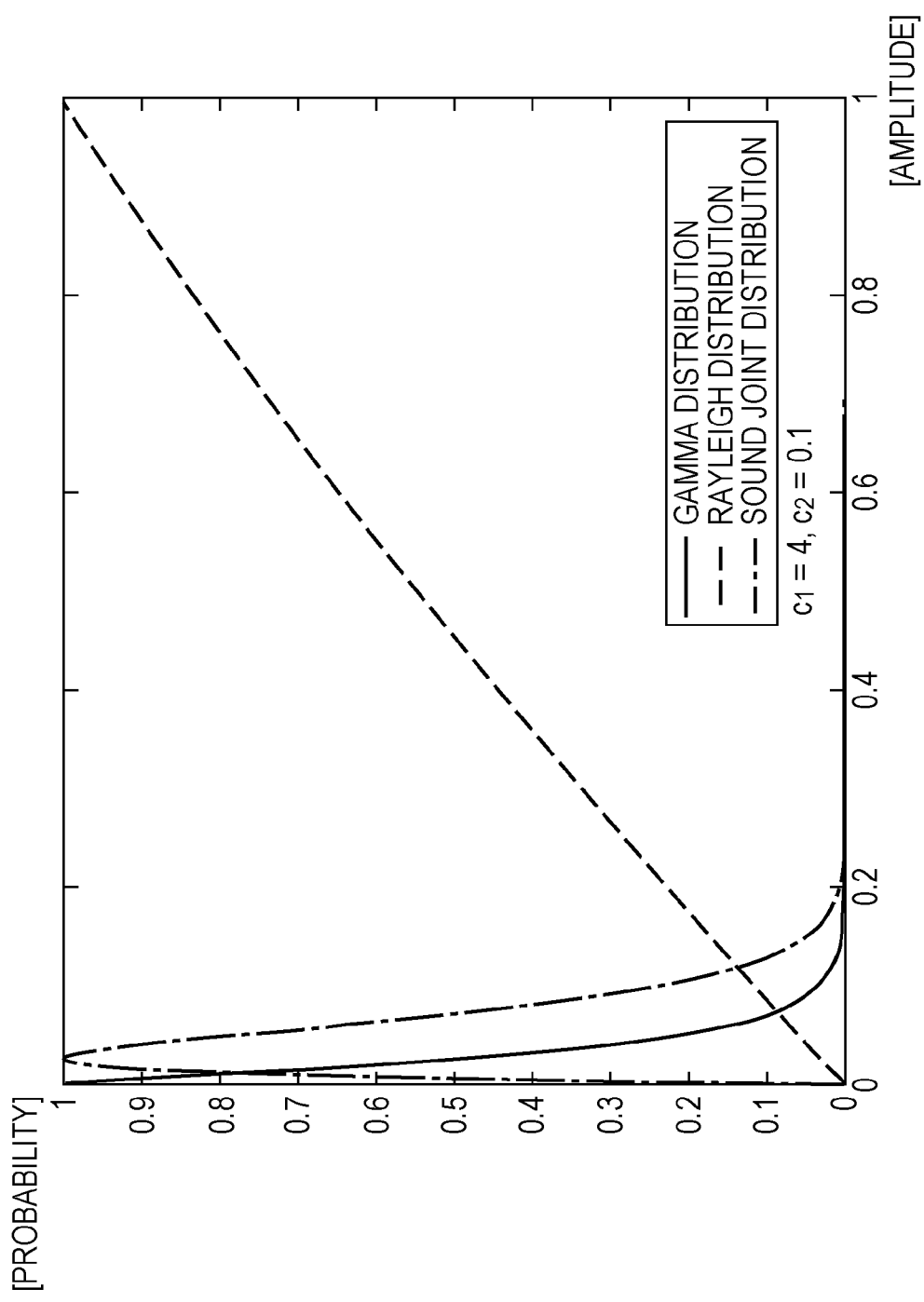
FIG. 6 is a view showing an example of a joint distribution model of sound according to Embodiment 1.
Figure 7:
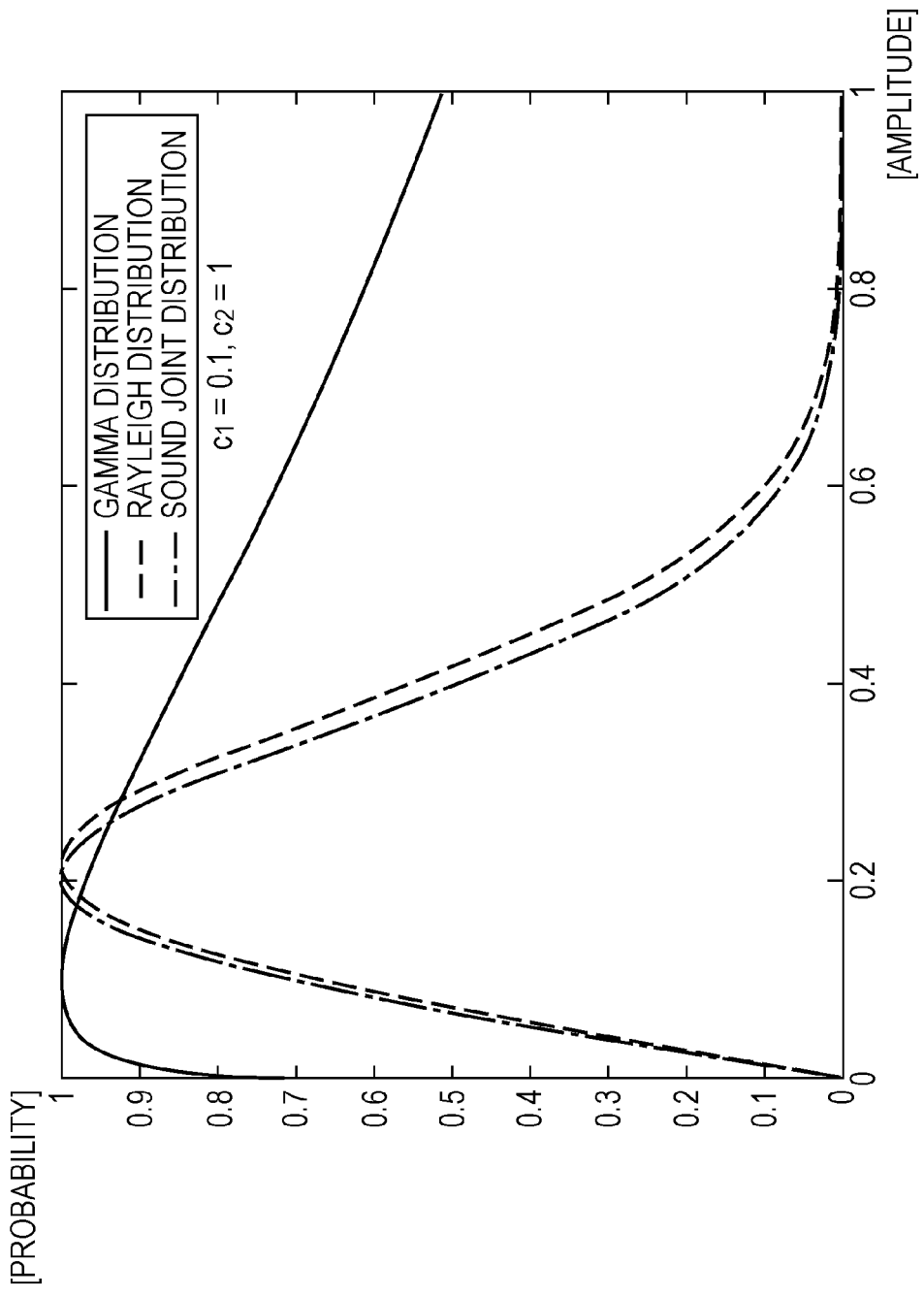
FIG. 7 is a view showing an example of a joint distribution model of sound according to Embodiment 1.

FIGS. 6 and 7 are views showing an example of a joint distribution model of sound according to Embodiment 1. In FIGS. 6 and 7, distribution models are normalized so that shapes of distributions (statistical distributions) can be compared.

Specifically, FIG. 6 shows, as an example, a joint distribution of sound, a gamma distribution, and a Rayleigh distribution obtained in a case where $c_1=4$ and $c_2=0.1$. That is, FIG. 6 shows a joint distribution model of sound generated from the gamma distribution and the Rayleigh distribution at ratios of $c_1=4$ and $c_2=0.1$.

FIG. 7 shows, as another example, a joint distribution of sound, a gamma distribution, and a Rayleigh distribution obtained in a case where $c_1=0.1$ and $c_2=1$. That is, FIG. 7 shows a joint distribution model of sound generated from the gamma distribution and the Rayleigh distribution at ratios of $c_1=0.1$ and $c_2=1$.

Embodiment 2

Figure 8:
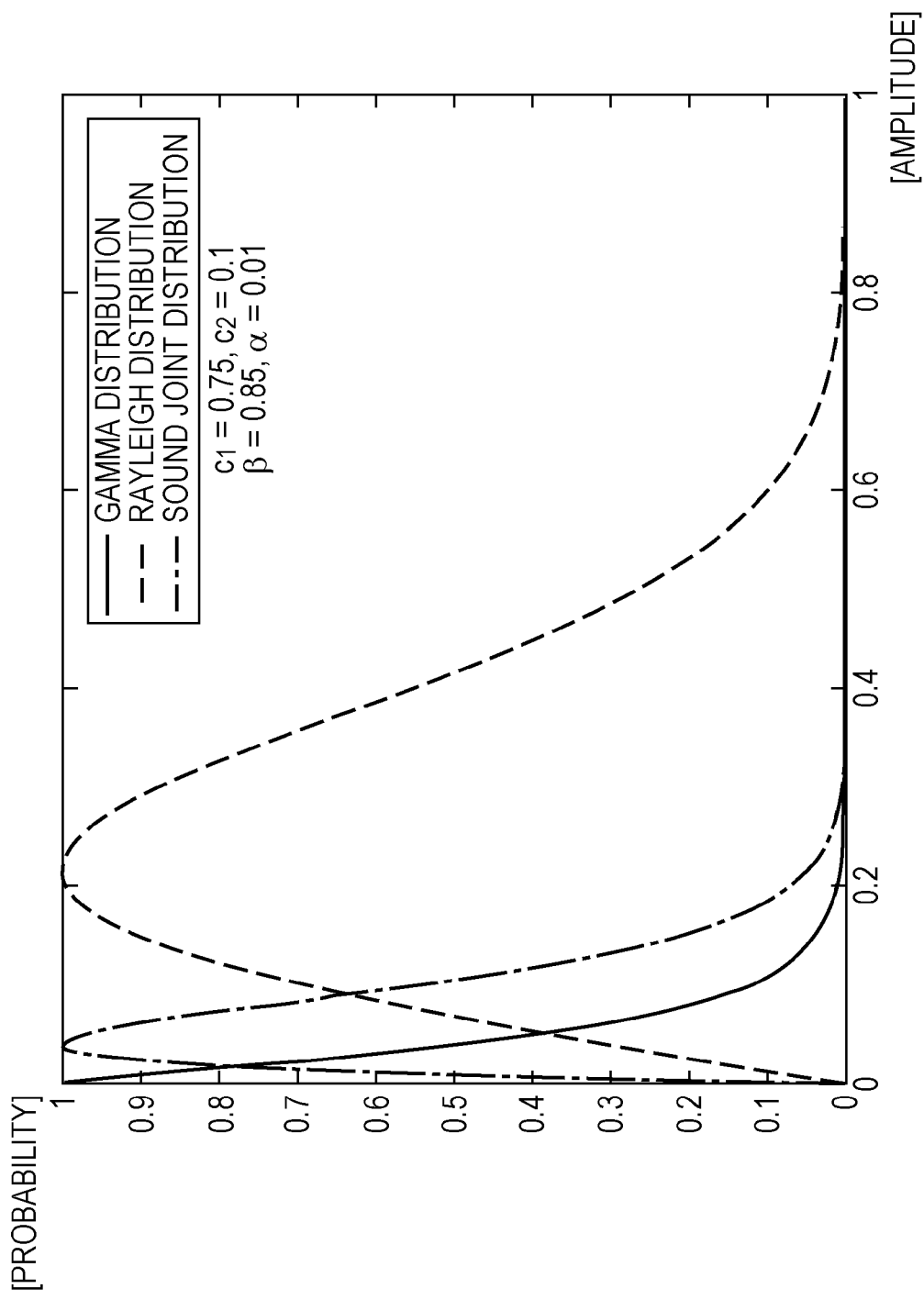
FIG. 8 is a view showing an example of a joint distribution model of sound according to Embodiment 2.
Figure 9:
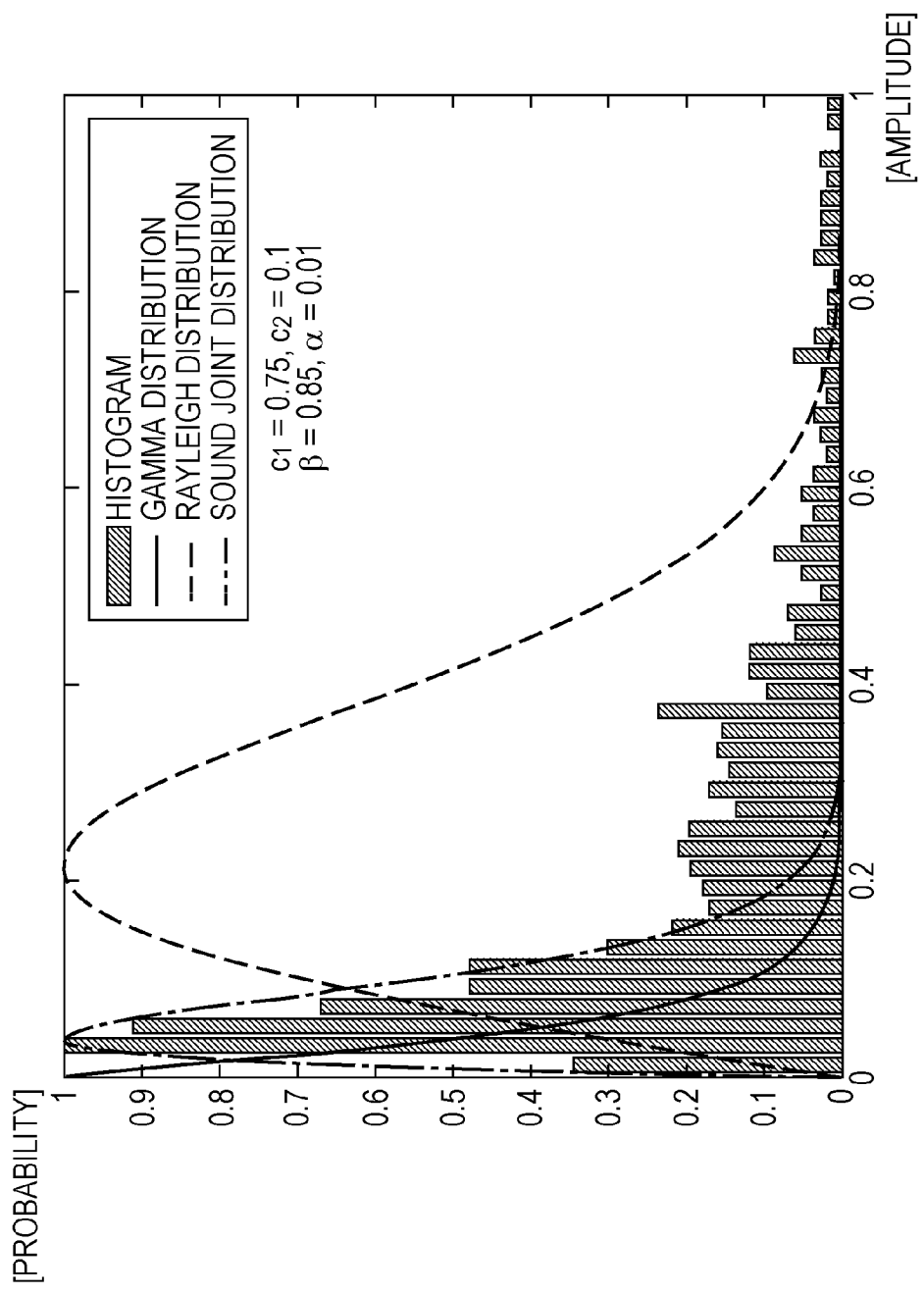
FIG. 9 is a view showing effects of the joint distribution model of sound shown in FIG. 8.

FIG. 8 is a view showing an example of a joint distribution model of sound according to Embodiment 2. FIG. 9 is a view showing an effect of the joint distribution model of sound shown in FIG. 8. In FIGS. 8 and 9, distribution models are normalized so that shapes of distributions can be compared.

Specifically, FIG. 8 shows, as an example, a joint distribution of sound, a gamma distribution, and a Rayleigh distribution obtained in a case where $\alpha=0.01$ and $\beta=0.85$ and $c_1=0.75$ and $c_2=0.1$.

As shown in FIG. 9, the joint distribution of sound shown in FIG. 8 accurately approximates the amplitude spectrum of sound (FIG. 3) in a case where a noise segment and a sound segment concurrently exist in an analysis segment.

Embodiment 3

Figure 10:
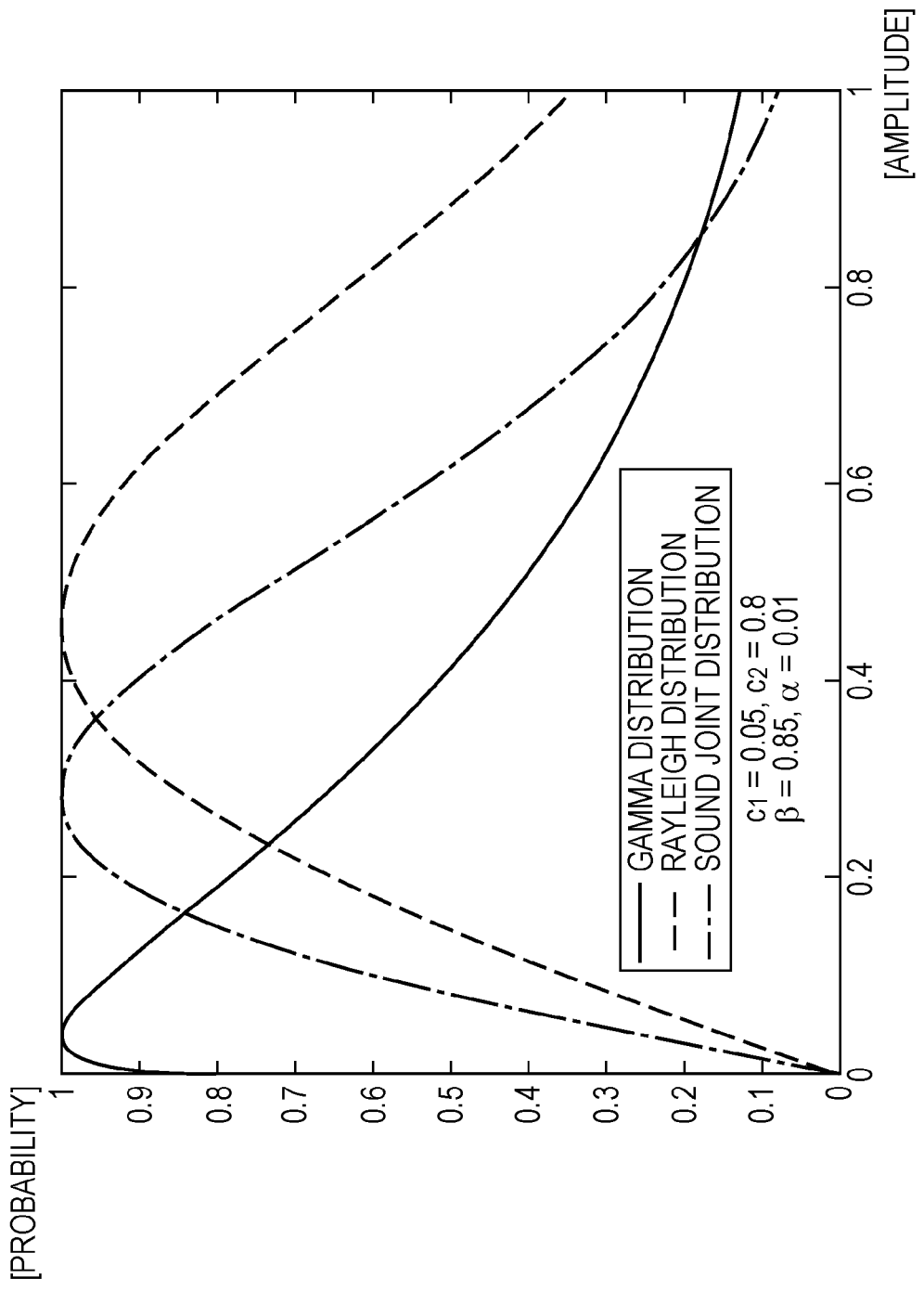
FIG. 10 is a view showing an example of a joint distribution model of sound according to Embodiment 3.
Figure 11:
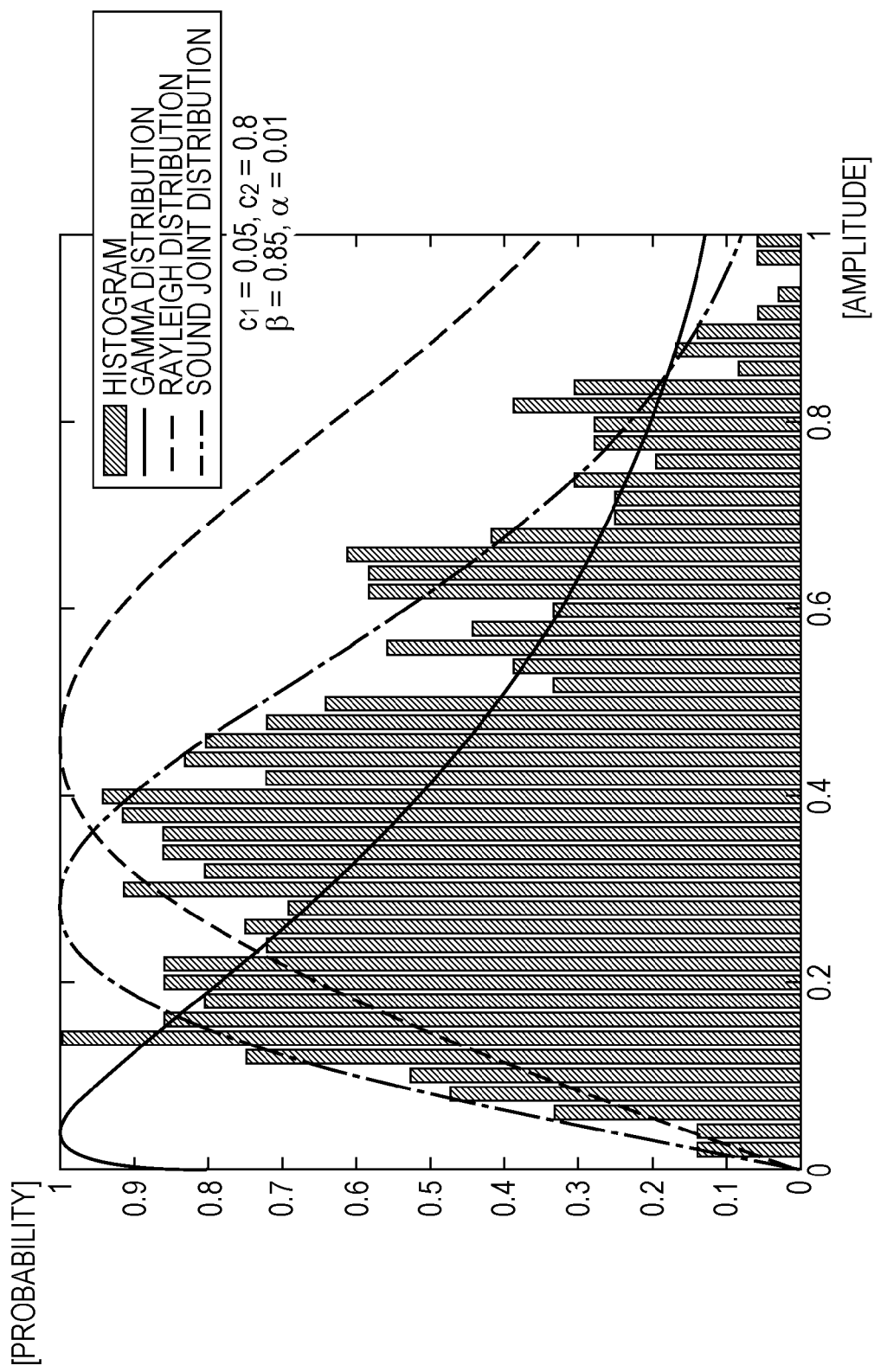
FIG. 11 is a view showing effects of the joint distribution model of sound shown in FIG. 10.

FIG. 10 is a view showing an example of a joint distribution model of sound according to Embodiment 3. FIG. 11 is a view showing an effect of the joint distribution model of sound shown in FIG. 10. In FIGS. 10 and 11, distribution models are normalized so that shapes of distributions can be compared.

Specifically, FIG. 10 shows, as an example, a joint distribution of sound, a gamma distribution, and a Rayleigh distribution obtained in a case where $\alpha=0.01$ and $\beta=0.85$ and $c_1=0.05$ and $c_2=0.8$.

As shown in FIG. 11, the joint distribution of sound shown in FIG. 10 accurately approximates the amplitude spectrum of sound (FIG. 2) in a case where no noise segment exists and only a sound spectrum exists in an analysis segment.

Operation of Noise Suppressing Apparatus

First, operation of the noise suppressing apparatus 100, which is a minimum configuration of the noise suppressing apparatus 1, is described with reference to FIG. 12, and operation of the noise suppressing apparatus 1 is described with reference to FIG. 13.

Figure 12:
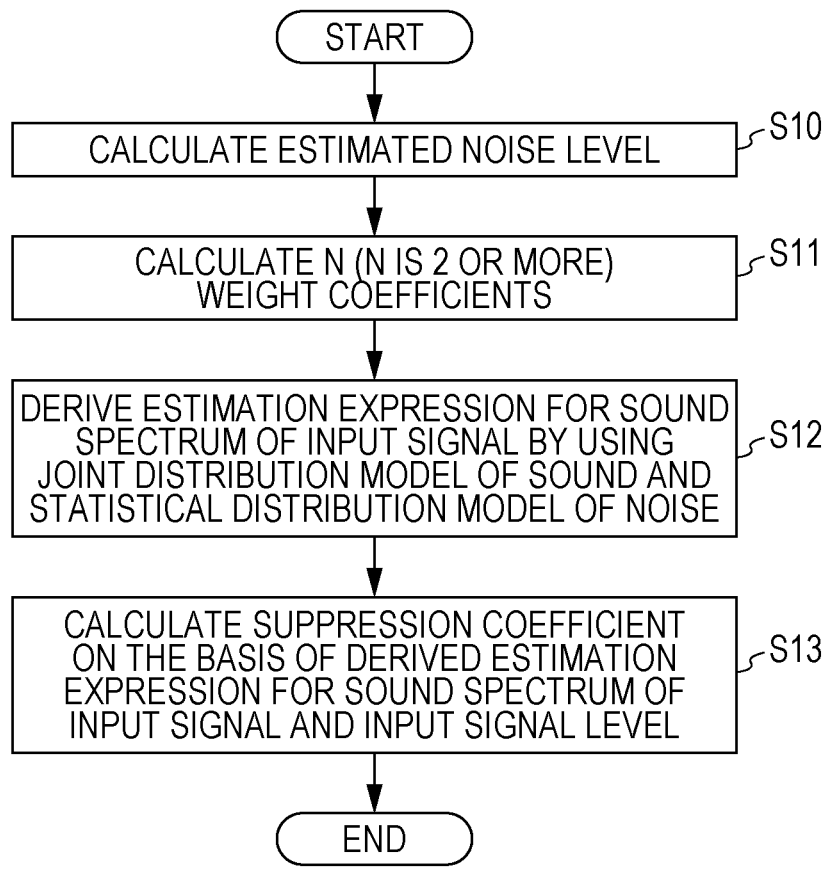
FIG. 12 is a flow chart showing operation performed by the minimum configuration of the noise suppressing apparatus in the embodiment.

FIG. 12 is a flow chart showing operation performed by the minimum configuration of the noise suppressing apparatus according to the embodiment.

First, the noise suppressing apparatus 100 calculates an estimated noise level of an input signal (S10).

Next, the noise suppressing apparatus 100 calculates N (N is 2 or more) weight coefficients at predetermined intervals (S11).

Next, the noise suppressing apparatus 100 calculates a joint distribution model of sound by weighting N statistical distribution models with the N weight coefficients and derives an estimation expression for a sound spectrum of the input signal on the basis of posteriori probability that uses the calculated joint distribution model of sound as priori probability (S12).

Finally, the noise suppressing apparatus 100 calculates a suppression coefficient on the basis of the derived estimation expression for the sound spectrum of the input signal and the input signal level (S13).

Figure 13:
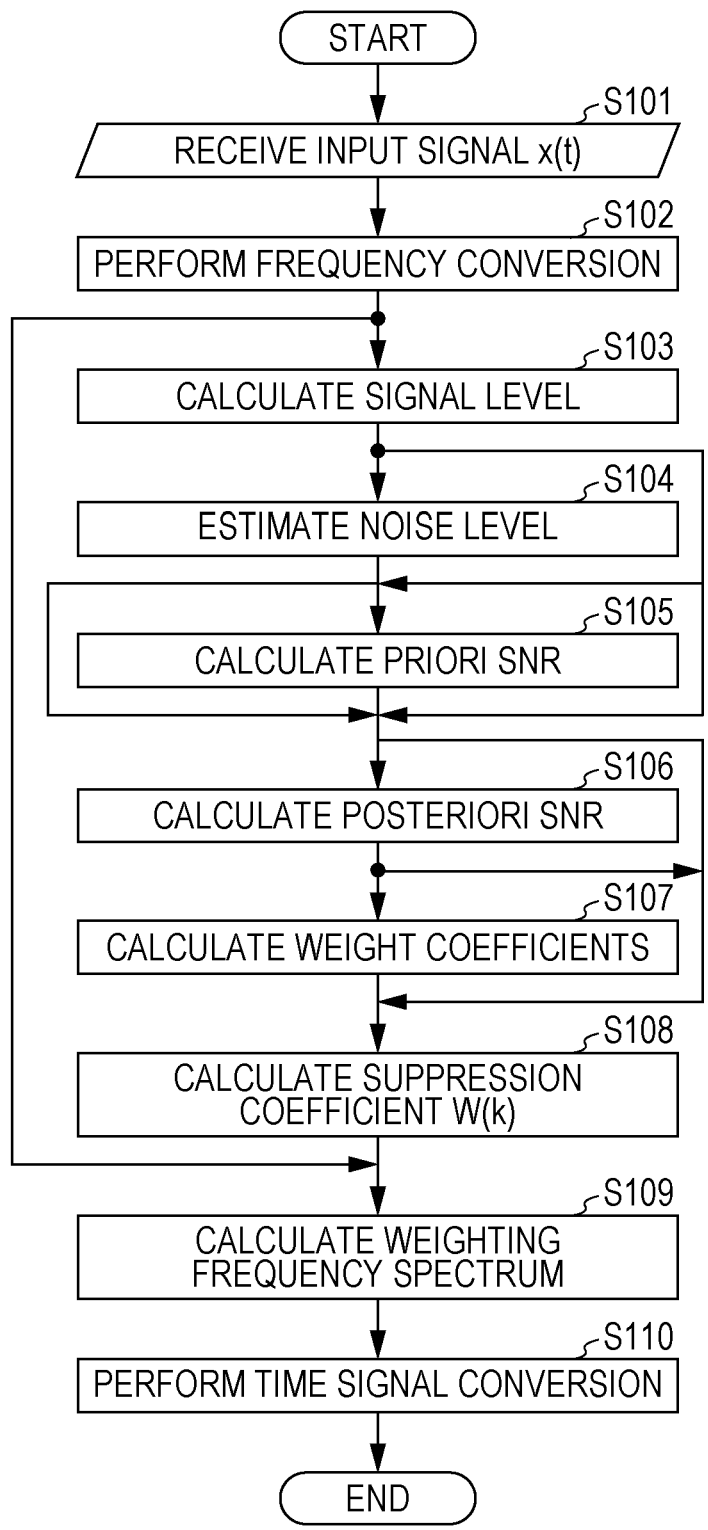
FIG. 13 is a flow chart showing operation of the noise suppressing apparatus in the embodiment.

FIG. 13 is a flow chart showing operation of the noise suppressing apparatus according to the embodiment.

First, an input signal x (t) such as a sound signal is input to the noise suppressing apparatus 1 (S101).

Next, the noise suppressing apparatus 1 performs frequency conversion (S102). Specifically, the frequency converting section 10 converts the input signal x (t) into a frequency spectrum X (k).

Next, the noise suppressing apparatus 1 calculates a signal level of the input signal (S103). Specifically, the noise level estimating section 11 calculates, as the signal level, an absolute value |X (k)| of the frequency spectrum X (k) or a power spectrum X (k) ^2 of the input signal x (t).

Next, the noise suppressing apparatus 1 calculates an estimated noise level of the input signal (S104). Specifically, the noise level estimating section 11 estimates a noise level N (k) ^2 by using the absolute value |X (k)| of the frequency spectrum X (k) or the power spectrum X (k) ^2 of the input signal x (t).

Next, the noise suppressing apparatus 1 calculates a priori SNR (S105). Specifically, the priori SNR calculating section 12 calculates Q1 (k), which is the priori SNR, by using the power spectrum X (k) ^2 of the input signal x (t), the estimated noise level N (k) ^2, and a suppression coefficient W (k) calculated previously.

Next, the noise suppressing apparatus 1 calculates a posteriori SNR (S106). Specifically, the posteriori SNR estimating section 13 calculates Q2 (k), which is the posteriori SNR, by using the power spectrum X (k) ^2 of the input signal x (t) and the estimated noise level N (k) ^2.

Next, the noise suppressing apparatus 1 calculates weight coefficients (S107). Specifically, the weight coefficient calculating section 14 calculates weight coefficients c1 (k), . . . and cN (k) by which random variables that correspond to N (2 or more) statistical distribution models are multiplied.

Next, the noise suppressing apparatus 1 calculates a suppression coefficient (S108). Specifically, the suppression coefficient calculating section 15 derives an estimation expression for a sound spectrum of the input signal by using posteriori probability that uses a joint distribution model of sound as priori probability and is calculated from the product of statistical distribution models of noise in accordance with Bayes' theorem, and the noise suppressing apparatus 1 calculates a suppression coefficient on the basis of the derived estimation expression for the sound spectrum of the input signal and the estimated input signal level. Here, the suppression coefficient calculating section 15 calculates the joint distribution model of sound by weighting the N statistical distribution models with the N weight coefficients at predetermined intervals.

Next, the noise suppressing apparatus 1 calculates a weighting frequency spectrum (S109). Specifically, the noise suppressing apparatus 1 calculates, as the weighting frequency spectrum, a spectrum Y (k) by multiplying the frequency spectrum X (k) by the suppression coefficient W (k) calculated in the suppression coefficient calculating section 15. That is, the noise suppressing apparatus 1 calculates spectrum Y (k)=frequency spectrum X (k)×suppression coefficient W (k).

Finally, the noise suppressing apparatus 1 performs time signal conversion (S110). Specifically, the time signal converting section 16 converts the weighting frequency spectrum into an output signal y (t), which is a time signal, and then outputs the output signal y (t).

Effects etc. of Embodiments

As described above, according to the present embodiment, it is possible to provide a noise suppressing apparatus and a noise suppressing method that can calculate a noise suppression coefficient that achieves higher estimation accuracy.

Specifically, since probability of occurrence of sound (a sound spectrum) included in an input signal can be accurately approximated, a noise suppression coefficient that achieves higher estimation accuracy can be calculated. It is therefore possible to provide a noise suppressing apparatus that can remove noise without over-suppression of sound while maintaining high noise suppression performance.

Furthermore, according to the present embodiment, a joint distribution model of sound is expressed by the product of N (2 or more) statistical distribution models. Since the joint distribution model of sound that is obtained by multiplying random variables that correspond to the N statistical distribution models by the N weight coefficients calculated by the weight coefficient calculating section 14 can express various distribution shapes, it is possible to increase accuracy of approximation of a sound spectrum included in an input signal. This makes it possible to calculate a noise suppression coefficient that achieves higher estimation accuracy.

In other words, according to the present embodiment, probability of occurrence of a sound spectrum included in an input signal is expressed by the product of a plurality of distributions varied in accordance with the state in an analysis segment. In this way, an appropriate distribution shape can be obtained in accordance with the state of a sound spectrum in the analysis segment. This improves accuracy of approximation of a distribution of probability of occurrence of the sound spectrum. It is therefore possible to provide a noise suppressing apparatus that can secure clarity of sound while maintaining the effect of noise suppression.

Furthermore, according to the present embodiment, since each of the N statistical distribution models is constituted by a distribution of an amplitude spectrum of sound, it becomes possible to use a distribution, such as a gamma distribution, that can use only a positive value. It is therefore possible to improve flexibility of a distribution shape that can be expressed by a joint distribution model of sound.

In the above description, a gamma distribution and a Rayleigh distribution are used as examples of the N statistical distribution models. However, distributions constituting the N statistical distributions are not limited to these two distributions. For example, in a segment in which sound is included, a distribution, such as a Rayleigh distribution or a normal distribution, whose peak in the vicinity of zero is not high as compared with surrounding values may be used as one of the N statistical distribution models.

Furthermore, such an arrangement is also possible in which a Laplace distribution or a gamma distribution is used as the first statistical distribution model and a Rayleigh distribution or a normal distribution is used as the second statistical distribution model (four patterns).

By thus selecting a statistical distribution that has a high approximation effect in a case where a noise segment is included and selecting a statistical distribution that has a high approximation effect in a case where a noise segment is not included, an optimum distribution shape can be formed according to the situation. This leads to an improvement in approximation accuracy.

Furthermore, a combination of statistical distribution models that constitute the N statistical distribution models may be different in two or more bands of the frequency spectrum.

By thus causing a combination of the N statistical distribution models to be different in two or more frequency components of the frequency spectrum, it is possible to select an optimum configuration, for example, in different bands of a frequency constituted by a low band and a high band. Therefore, an optimum distribution shape can be formed according to the situation. This leads to an improvement in approximation accuracy.

Furthermore, according to the present embodiment, MAP estimation method and Bayes' theorem are used to calculate an arithmetic expression for a noise suppression coefficient for suppressing noise in accordance with an estimation expression for a sound spectrum. However, the present disclosure is not limited to this, and other methods can be used. For example, a noise suppression coefficient may be calculated by using the Minimum Mean Square Error method (MMSE method) and Bayes' theorem.

Modification

Figure 14:
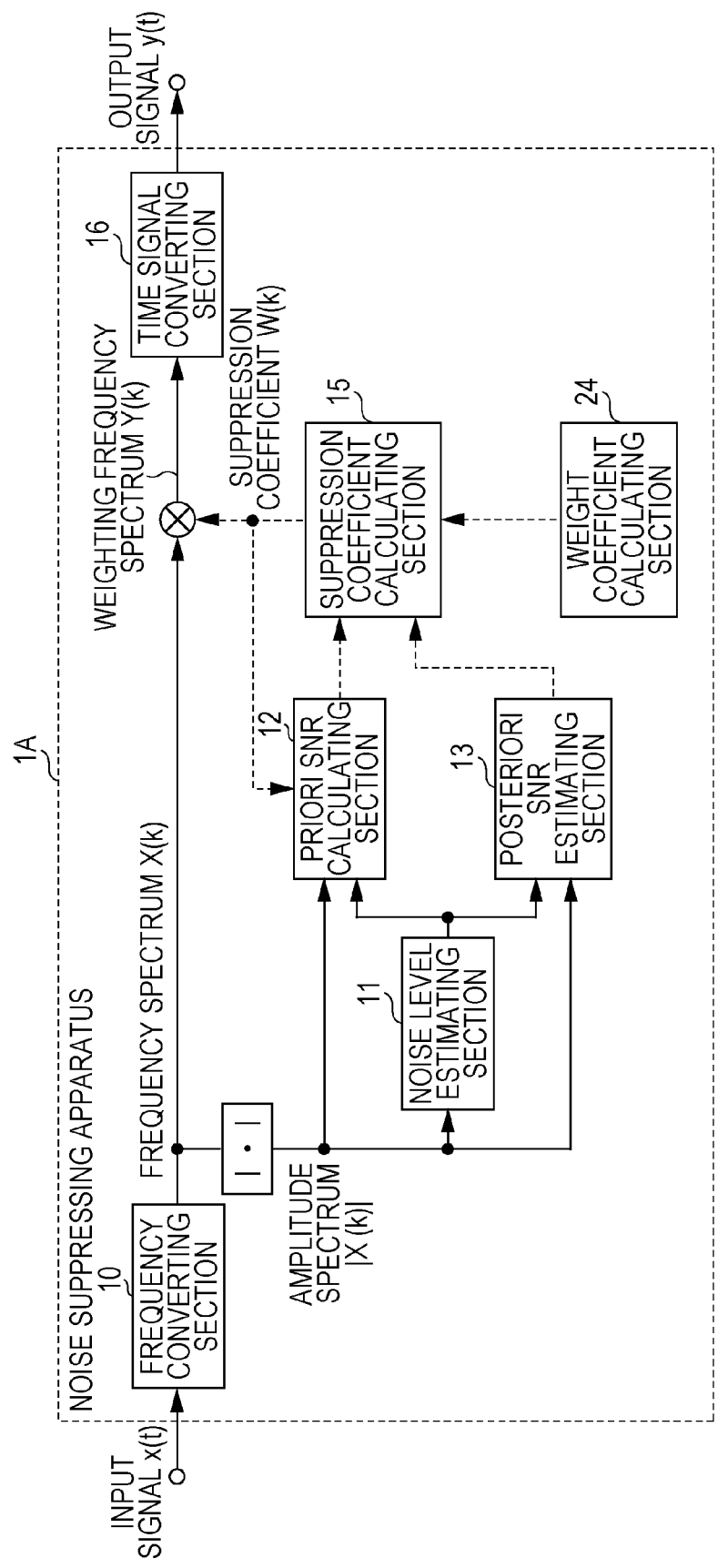
FIG. 14 is a view showing an example of a configuration of a noise suppressing apparatus according to a modification of the embodiment.
Figure 15:
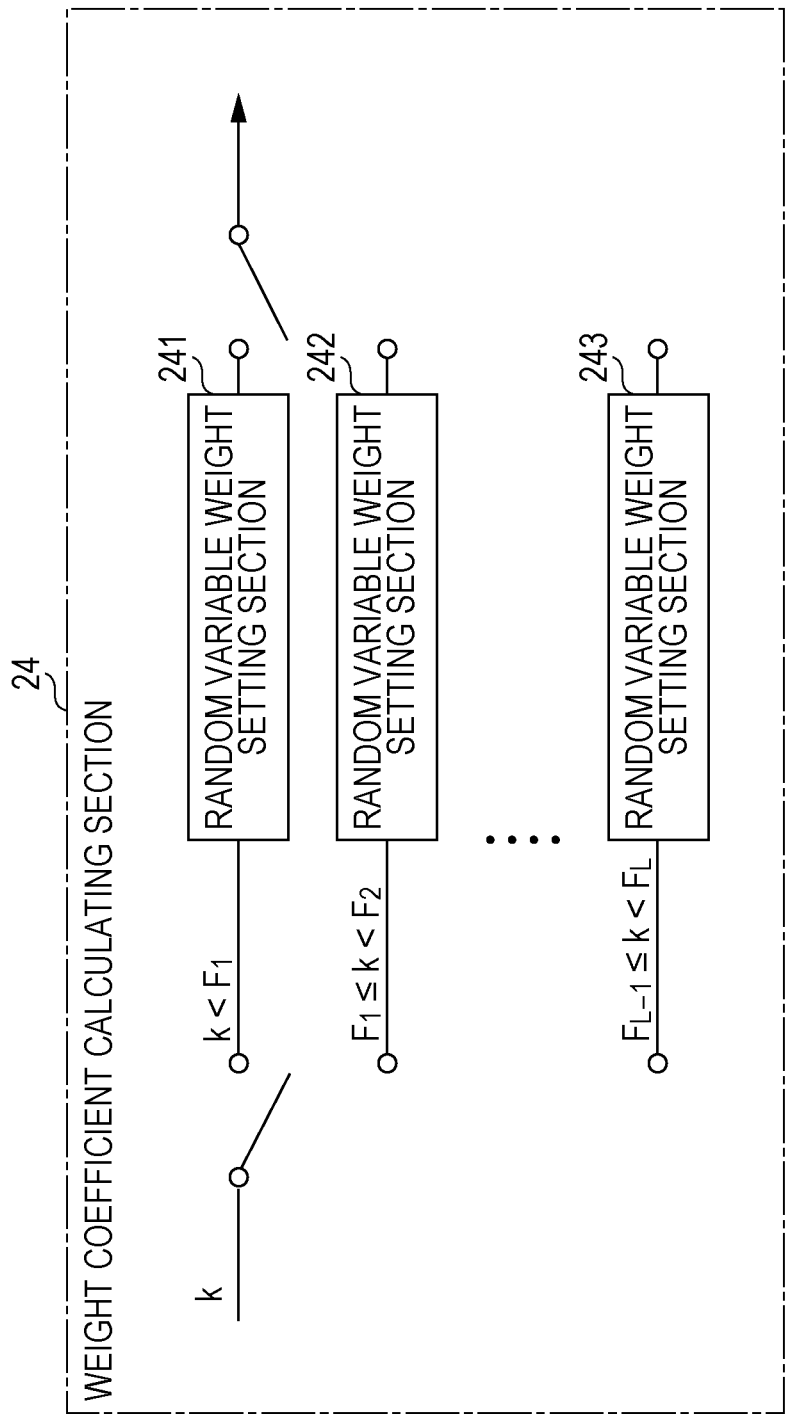
FIG. 15 is a view showing an example of a detailed configuration of the weight coefficient calculating section shown in FIG. 14.

FIG. 14 is a view showing an example of a configuration of a noise suppressing apparatus according to a modification of the embodiment. FIG. 15 is one example of a detailed configuration of the weight coefficient calculating section shown in FIG. 14. In FIG. 15, L represents the number of divisions of the frequency, and F represents a sample value of the frequency.

The noise suppressing apparatus 1A shown in FIG. 14 is different from the noise suppressing apparatus 1 according to Embodiment 1 in the configuration of the weight coefficient calculating section 24 and in that an estimation result (a posteriori SNR) of the posteriori SNR estimating section 13 is outputted only to the suppression coefficient calculating section 15. The differences are mainly described below.

A weight coefficient calculating section 24 calculates N weight coefficients that includes 2 or more different weight coefficients in two or more bands of a frequency spectrum.

For example, the weight coefficient calculating section 24 includes random variable weight setting sections 241 to 243 shown in FIG. 15.

The random variable weight setting sections 241 to 243 set different fixed values (weight coefficients) for respective frequencies.

The random variable weight setting section 241 sets a weight coefficient in a band (frequency band) of F1, the random variable weight setting section 242 sets a weight coefficient in a band (frequency band) between F1 and F2, and the random variable weight setting section 243 sets a weight coefficient in a band (frequency band) between F1-1 and FL.

In this way, the weight coefficient calculating section 24 can adaptively calculate weight coefficients in respective bands. Therefore, according to the noise suppressing apparatus 1A, an optimum distribution shape can be formed according to the situation. This leads to an improvement in approximation accuracy.

Other Modifications

A noise suppressing apparatus and a noise suppressing method according to one aspect or plural aspects of the present disclosure have been described so far on the basis of the embodiment, but the present disclosure is not limited to this embodiment. Various modifications to the embodiment that can be thought of by a person skilled in the art and combinations of constituent elements in different embodiments may be encompassed within the scope of the one aspect or plural aspects of the present disclosure, as long as they are not deviated from the purpose of the present disclosure. For example, the following cases are also encompassed within the present disclosure.

(1) To be specific, each of the above apparatuses is a computer system constituted by a microprocessor, a ROM, a RAM, a hard disc unit, a display unit, a keyboard, a mouse, etc. In the RAM or the hard disc unit, a computer program is stored. The microprocessor operates in accordance with the computer program. Each of the apparatuses thus achieves its functions. The computer program is a combination of a plurality of command codes indicative of a command given to the computer to achieve predetermined functions.

(2) Part of all of the constituent elements constituting each of the apparatuses may be realized by a single system LSI (Large Scale Integration). The system LSI is a super-multifunction LSI produced by integrating a plurality of elements on a single chip, specifically, a computer system including a microprocessor, a ROM, a RAM, etc. In the RAM, a computer program is stored. The microprocessor operates in accordance with the computer program. The system LSI thus achieves its functions.

(3) Part of all of the constituent elements constituting each of the apparatuses may be realized by an IC card detachably provided in the apparatus or a single module. The IC card or the module is a computer system including a microprocessor, a ROM, a RAM, etc. The IC card or the module may include the super-multifunction LSI. The microprocessor operates in accordance with the computer program. The IC card or the module thus achieves its functions. The IC card or the module may have tamper resistance.

(4) The present disclosure may be the above methods. Furthermore, the present disclosure may be a computer program for realizing these methods by a computer or may be a digital signal made up of the computer program.

Furthermore, the present disclosure may be the computer program or the digital signal stored in a computer-readable recording medium such as a flexible disc, a hard disc, a CD-ROM, an MO, a DVD, a DVD-ROM, a DVD-RAM, a BD (Blu-ray (registered trademark) Disc), or a semiconductor memory. Furthermore, the present disclosure may be the digital signal recorded on these recording media.

Furthermore, the present disclosure may be one that transfers the computer program or the digital signal via a network represented by an electrical communication line, a wireless or wires communication line, and the Internet, data broadcasting, etc.

Furthermore, the present disclosure may be a computer system including a memory in which the computer program is stored and a microprocessor that operates in accordance with the computer program.

Furthermore, the program or the digital signal may be performed by another independent computer system by transferring the program or the digital signal recorded on the recording media or by transferring the program or the digital signal via the network etc.

(5) The embodiments and the modifications may be combined.

The present disclosure makes it possible to automatically suppress noise such as paper noise occurring in the vicinity of a microphone and can be used as an apparatus having a hands-free function, a noise suppressing apparatus in a conference system, or a noise suppressing apparatus in a broadcasting apparatus such as a television set.

What is claimed is:

1. A noise suppressing apparatus, comprising:
    a frequency converting section that converts an input signal into a frequency spectrum;
    a noise level estimating section that calculates an estimated noise level of the input signal by using the frequency spectrum;
    a weight coefficient calculating section that calculates N weight coefficients at predetermined intervals, N being 2 or more; and
    a suppression coefficient calculating section that calculates a product of N statistical distribution models weighted by the N weight coefficients to obtain a joint distribution model of sound, derives an estimation expression for a sound spectrum of the input signal on the basis of posteriori probability using the calculated joint distribution model of sound as priori probability, and calculates a suppression coefficient for suppressing noise of the input signal on the basis of the derived estimation expression for the sound spectrum of the input signal and level of the input signal,
    wherein the joint distribution model of sound approximates a probability of occurrence of the sound spectrum of the input signal.

2. The noise suppressing apparatus according to claim 1,
    wherein the suppression coefficient calculating section calculates the posteriori probability by using a product of the calculated joint distribution model of sound and a statistical distribution model of noise that approximates a probability of observed noise, and derives the estimation expression for the sound spectrum of the input signal.

3. The noise suppressing apparatus according to claim 1, further comprising:
    a priori SNR calculating section that calculates a priori SNR indicative of a ratio of a weighted signal level to a noise level by using the frequency spectrum, the estimated noise level, and a suppression coefficient calculated previously;
    a posteriori SNR calculating section that calculates a posteriori SNR indicative of a ratio of the input signal level to the noise level by using the frequency spectrum and the estimated noise level; and
    a time signal converting section that converts, into a time signal, a weighted frequency spectrum obtained by multiplying the frequency spectrum by a current suppression coefficient calculated by the suppression coefficient calculating section,
    the weight coefficient calculating section calculating the N weight coefficients by using the priori SNR or the posteriori SNR, and
    the suppression coefficient calculating section that (i) calculates, as the joint distribution model of sound that approximates the probability of occurrence of the sound spectrum included in the frequency spectrum, a product of the N statistical distribution models weighted by using the N weight coefficients calculated by the weight coefficient calculating section, (ii) calculates a statistical distribution model of noise that approximates a probability of occurrence of a noise spectrum included in the frequency spectrum, (iii) derives the estimation expression for the sound spectrum of the input signal from the product of the calculated statistical distribution model of noise and the joint distribution model of sound, and (iv) calculates the suppression coefficient from the estimation expression for the sound spectrum by using the priori SNR, the posteriori SNR, and the N weight coefficients calculated by the weight coefficient calculating section.

4. The noise suppressing apparatus according to claim 3, wherein a combination of statistical distribution models that constitute the N statistical distribution models differs in 2 or more bands of the frequency spectrum.

5. The noise suppressing apparatus according to claim 3, wherein the weight coefficient calculating section calculates the N weight coefficients including 2 or more different weight coefficients in 2 or more bands of the frequency spectrum.

6. The noise suppressing apparatus according to claim 1, wherein the N statistical distribution models include a gamma distribution model and a Rayleigh distribution model.

7. The noise suppressing apparatus according to claim 1, wherein the N statistical distribution models approximate probability of occurrence of an amplitude spectrum of sound.

8. The noise suppressing apparatus according to claim 1, wherein the suppression coefficient calculating section derives, as a function expression expressed by the expression 1, the estimation expression for the sound spectrum of the input signal by using MAP (maximum a posteriori) estimation and Bayes' theorem:

$$\hat{S} = \underset{S}{\operatorname{argmax}} P(S \mid X) = \underset{S}{\operatorname{argmax}} \frac{P(X \mid S)P(S)}{P(X)} \quad \text{expression 1}$$

where X represents an amplitude of a spectrum of the input signal, S represents an amplitude of a sound spectrum, P (S) represents the joint distribution model of sound of probability of occurrence of S, and P (X|S) represents a statistical distribution model of noise.

9. The noise suppressing apparatus according to claim 8, wherein the suppression coefficient calculating section calculates the suppression coefficient in accordance with an arithmetic expression obtained by partially differentiating the derived estimation expression for the sound spectrum with an amplitude of the sound spectrum and setting the partially differentiated estimation expression to zero.

10. A noise suppressing method, comprising:
converting an input signal into a frequency spectrum;
calculating an estimated noise level of the input signal by using the frequency spectrum;
calculating N weight coefficients at predetermined intervals, N being 2 or more; and
calculating a product of N statistical distribution models weighted by the N weight coefficients to obtain a joint distribution model of sound, deriving an estimation expression for a sound spectrum of the input signal on the basis of posteriori probability using the calculated joint distribution model of sound as a priori probability, and calculating a suppression coefficient for suppressing noise of the input signal on the basis of the derived estimation expression for the sound spectrum of the input signal and level of the input signal,
wherein the joint distribution model of sound approximates a probability of occurrence of the sound spectrum of the input signal.

11. A noise suppressing apparatus, comprising:
one or more memories; and
circuitry that, in operation,
converts an input signal into a frequency spectrum;
calculates an estimated noise level of the input signal by using the frequency spectrum;
calculates N weight coefficients at predetermined intervals, N being 2 or more;
calculates a product of N statistical distribution models weighted by the N weight coefficients to obtain a joint distribution model of sound;
derives an estimation expression for a sound spectrum of the input signal on the basis of posteriori probability using the calculated joint distribution model of sound as priori probability, the joint distribution model of sound approximates a probability of occurrence of the sound spectrum of the input signal; and
calculates a suppression coefficient for suppressing noise of the input signal on the basis of the derived estimation expression for the sound spectrum of the input signal and level of the input signal.

* * * * *